US009740963B2

(12) United States Patent
Sawhney et al.

(10) Patent No.: US 9,740,963 B2
(45) Date of Patent: Aug. 22, 2017

(54) MULTI-DIMENSIONAL REALIZATION OF VISUAL CONTENT OF AN IMAGE COLLECTION

(71) Applicant: SRI International, Menlo Park, CA (US)

(72) Inventors: Harpreet Singh Sawhney, Princeton Junction, NJ (US); Jayakrishnan Eledath, Robbinsville, NJ (US); Mayank Bansal, Lawrenceville, NJ (US); Bogdan C. Matei, Princeton Junction, NJ (US); Xutao Lv, East Windsor, NJ (US); Chaitanya Desai, Lawrenceville, NJ (US); Timothy Shields, Lumberton, NJ (US)

(73) Assignee: SRI International, Menlo Park, CA (US)

( * ) Notice: Subject to any disclaimer, the term of this patent is extended or adjusted under 35 U.S.C. 154(b) by 334 days.

(21) Appl. No.: 14/452,244

(22) Filed: Aug. 5, 2014

(65) Prior Publication Data

US 2016/0042253 A1   Feb. 11, 2016

(51) Int. Cl.
G06K 9/62 (2006.01)
G06F 17/30 (2006.01)
G06K 9/00 (2006.01)

(52) U.S. Cl.
CPC ....... *G06K 9/6255* (2013.01); *G06F 17/3064* (2013.01); *G06F 17/30244* (2013.01); *G06K 9/00684* (2013.01); *G06K 9/6215* (2013.01); *G06K 9/6218* (2013.01); *G06K 9/6224* (2013.01); *G06K 2209/25* (2013.01)

(58) Field of Classification Search
None
See application file for complete search history.

(56) References Cited

U.S. PATENT DOCUMENTS

| 8,339,456 | B2   | 12/2012 | Eledath et al. |
| 8,634,638 | B2   | 1/2014  | Han et al. |
| 8,832,096 | B1 * | 9/2014  | Jing ................. G06F 17/30247 707/706 |
| 9,229,956 | B2 * | 1/2016  | Ke .................... G06F 17/30277 |
| 2013/0282747 | A1 | 10/2013 | Cheng et al. |
| 2014/0270363 | A1 | 9/2014  | Chakraborty et al. |
| 2014/0270482 | A1 | 9/2014  | Chakraborty et al. |

* cited by examiner

*Primary Examiner* — Chan Park
*Assistant Examiner* — Elisa Rice
(74) *Attorney, Agent, or Firm* — Moser Taboada

(57) ABSTRACT

A computing system for realizing visual content of an image collection executes feature detection algorithms and semantic reasoning techniques on the images in the collection to elicit a number of different types of visual features of the images. The computing system indexes the visual features and provides technologies for multi-dimensional content-based clustering, searching, and iterative exploration of the image collection using the visual features and/or the visual feature indices.

6 Claims, 8 Drawing Sheets

MULTI-DIMENSIONAL REALIZATION OF VISUAL CONTENT OF AN IMAGE COLLECTION

GOVERNMENT RIGHTS

This invention was made in part with government support under contract no. FA8750-12-C-0103 awarded by the Air Force Research Laboratory. The United States Government has certain rights in this invention.

BACKGROUND

The use of visual content, e.g., digital images and video, as a communication modality is becoming increasingly common. Digital photos and videos are frequently captured, viewed, and shared by mobile device applications, instant messaging, electronic mail, social media services, and other electronic communication methods. As a result, large collections of digital visual content exist in and across a variety of different locations, including the Internet, personal computers, and many other electronic devices.

In computer vision, mathematical techniques are used to detect the presence of and recognize various elements of the visual scenes that are depicted in digital images. Localized portions of an image, on which specific types of computations are done to produce visual features, may be used to analyze and classify the image. Low-level and mid-level features, such as interest points and edges, edge distributions, color distributions, shapes and shape distributions, may be computed from an image and used to detect, for example, people, objects, and landmarks that are depicted in the image. Machine learning algorithms are often used for image recognition.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
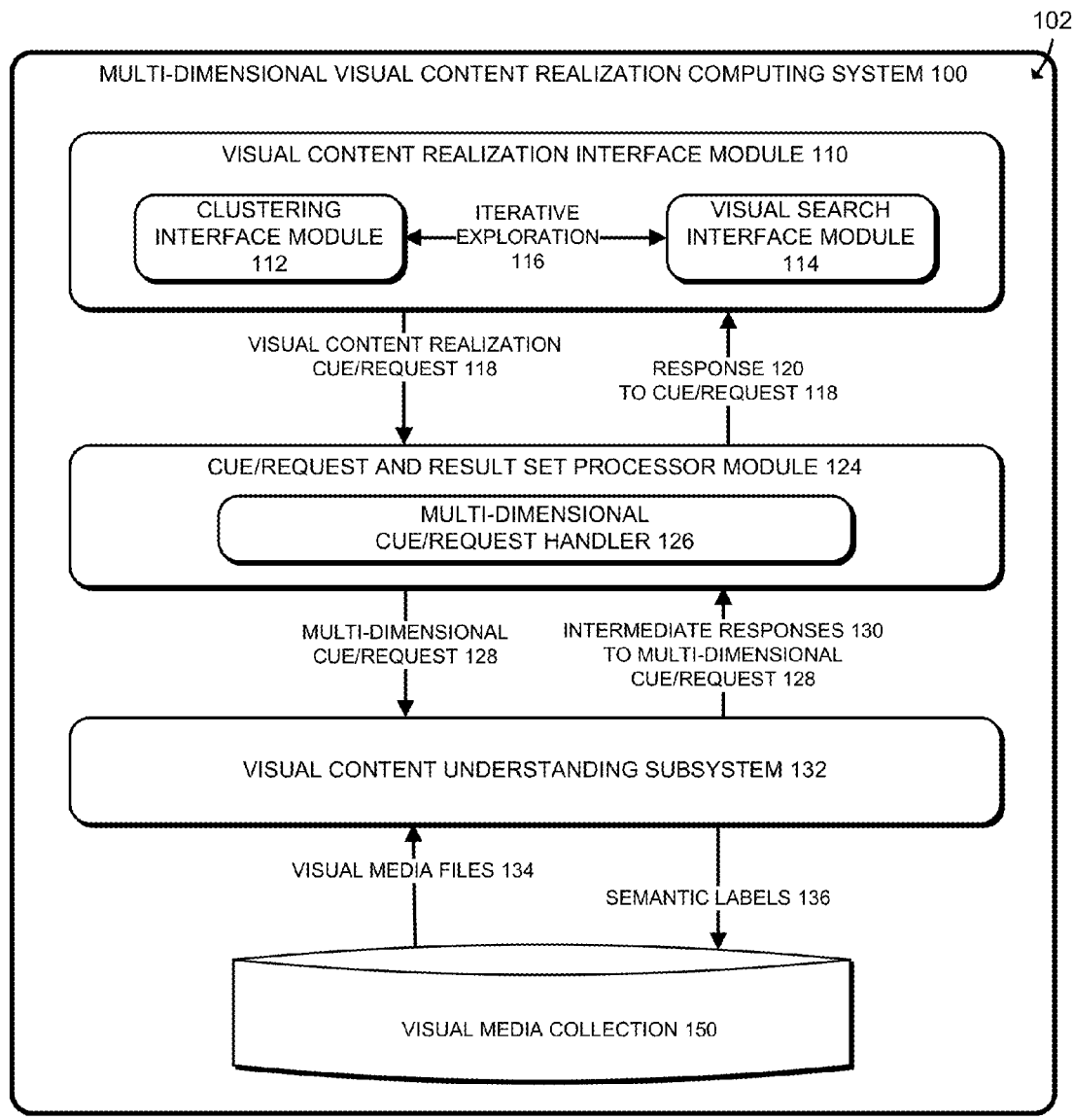
FIG. 1 is a simplified schematic diagram of an environment of at least one embodiment of a multi-dimensional visual content realization computing system including a visual content understanding subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Figure 2:
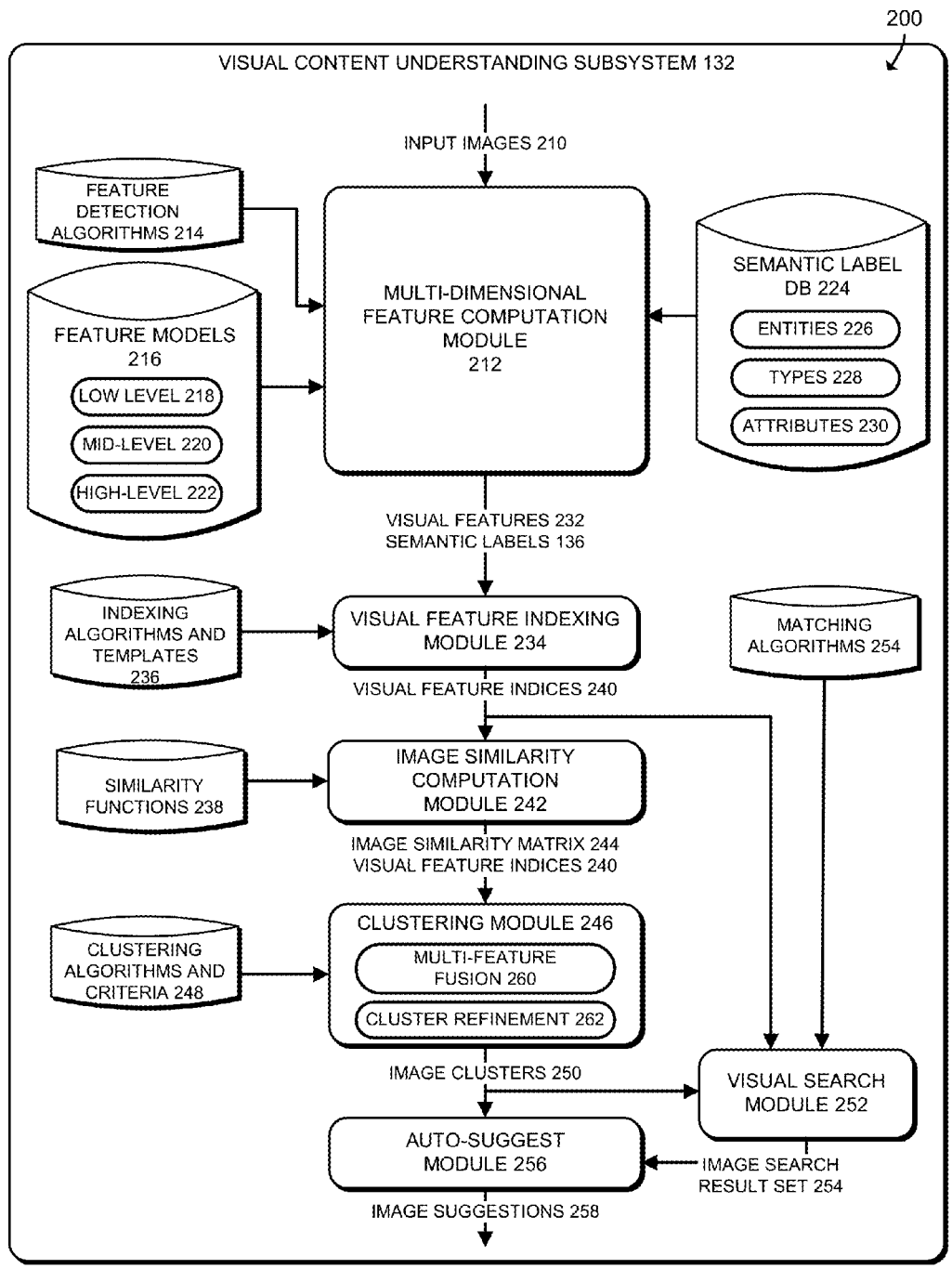
FIG. 2 is a simplified schematic diagram of an environment of at least one embodiment of the visual content understanding subsystem of FIG. 1.

Referring now to FIGS. 1-2, an embodiment of a computing system 100 for realizing visual content of a collection 150 of visual media files 134 is shown. In FIG. 1, the illustrative multi-dimensional visual content realization computing system 100 is shown in the context of an environment that may be created during the operation of the system 100 (e.g., a physical and/or virtual execution or "runtime" environment). The computing system 100, and each of the subsystems, modules, and other components of the computing system 100, is embodied as a number of machine-readable instructions, data structures and/or other components, which may be implemented as computer hardware, firmware, software, or a combination thereof. For ease of discussion, the multi-dimensional visual content realization computing system 100 or portions thereof may be referred to herein as a "visual search assistant," a "visual content realization assistant," an "image search assistant," or by similar terminology.

The computing system 100 includes a visual content understanding subsystem 132. Referring to FIG. 2, the visual content understanding subsystem 132 executes a number of feature detection algorithms 214 and applies semantic reasoning techniques (e.g., feature models 216) to, in an automated fashion, elicit a number of different types of visual features 232 that are depicted in the images 210 of the individual visual media files 134. The feature detection algorithms 214 and semantic reasoning techniques (e.g., feature models 216) detect and describe the visual features 232 at different levels of abstraction, including low-level features (e.g. points, edges, etc.) modeled by the low level feature model 218, mid-level features (e.g., segments, regions of interest, etc.) modeled by the mid-level feature model 220, and high-level features modeled by the high-level feature model 222. The high-level features can include, for example, semantic entities 226 (e.g., people, objects, vehicles, buildings, scene types, activities, interactions, etc.), semantic types 228 (e.g., categories or classes of people, objects, scenes, etc.), and semantic attributes 230 (e.g., gender, age, color, texture, shape, location, etc.). Each or any of the feature models 216 may be embodied as, for example, an Apache HBase database.

The computing system 100 uses the multi-dimensional visual features 232 to, in an automated fashion, generate semantic labels 136 for the visual media files 134. The semantic labels 136 are representative of visual content depicted in the visual media files 134 and are configured to express visual content of the files 134 in a human-intelligible form (e.g., natural language). Using the visual features 232 and/or the semantic labels 136, an image similarity computation subsystem 242 computes a number of different types of similarity measures, including, for example, similarities between different visual features 232 in an individual image 210, similarities between visual features 232 of different images 210 in a visual media file 122, similarities between visual features 232 of different visual media files 134, and similarities of visual features 232 across the visual media files 134 in the collection 150.

Each of the different types of similarity measures can relate to a different visual characteristic of the images 210 in the collection 150. Different similarity functions 238 can be defined and executed by the computing system 100 to capture different patterns of, for example, sameness and/or similarity of scenes, objects, locations, time of day, weather, etc. depicted in the images 210, and/or to capture similarity at different levels of abstraction (e.g., instance-based vs. category-based similarity, described further below). These different similarity measures can be used by the computing system 100 to supplement, or as an alternative to, more traditional "exact match"-type search and clustering techniques.

A visual feature indexing subsystem 234 creates visual feature indices 240. The visual feature indices 240 index the elicited visual features 232 in a manner that facilitates efficient and accurate multi-dimensional and/or sublinear content-based clustering, searching, and iterative exploration 116 of the collection 150, e.g., through the visual content realization interface module 110. These clustering, search, and exploration capabilities can be useful to, for example, conduct "ad hoc" exploration of large image data sets, particularly large data sets in which the visual content is largely or completely unknown or unorganized.

The multi-dimensional clustering, searching, and iterative exploration 116 of the collection 150 is further enabled by a clustering subsystem 246 and a visual search subsystem 252 interfacing with clustering and visual search interface modules 112, 114, respectively, of the visual content realization interface module 110, as described in more detail below. The illustrative computing system 100 also includes a cue/request and result set processor module 124, which provides a consistent framework by which the components of the visual content realization interface module 110 interface with the components of the visual content understanding subsystem 132.

As used herein, "visual media" may refer to, among other things, digital pictures (e.g., still photographs or individual frames of a video), sequences of digital pictures (e.g., an animation or photo montage), and/or digital videos. References herein to a "video" may refer to, among other things, a short video clip, an entire full-length video production, or different segments within a video or video clip (where a segment includes a sequence of two or more frames of the video). For ease of discussion, "image" may be used herein to refer to any or all of the aforementioned types of visual media, combinations thereof, and/or others. A "visual media file" as used herein may refer to a retrievable electronic file that contains one or more images, which may be stored in computer memory at the computing system 100 and/or other computing systems or devices. Visual media files 134 and images 210 in the collection 150 need not have been previously tagged with meta data or other identifying material in order to be useful to the computing system 100. The computing system 100 can operate on visual media files 134 and images 210 whether or not the files 134 or images 210 have been previously tagged or annotated in any way. To the extent that any of the content in the collection 150 is already tagged with, e.g., keywords, components of the computing system 100 can learn and apply those existing tags to indexing, similarity computation, clustering, searching, and/or other operations.

Referring to FIG. 1 in more detail, in use, the visual content realization interface module 110 interacts with an end user of the computing system 100 (e.g., by one or more components of a human-computer interface (HCI) subsystem 738, 770, shown in FIG. 7, described below) to, from time to time, receive visual content realization cues and/or requests 118 and, in response to the various cues/requests 118, display responses 120. For example, the clustering interface module 112 may interactively display (e.g. on a display device 742 of the computing system 100) one or more clusters 250 of visual media files 134 that the visual content understanding subsystem 132 automatically generates for the visual media collection 150. In doing so, the clustering interface module 112 may, among other things: display graphical representations of the various similarity measures computed for the visual media files 134 with respect to the visual features 232, and/or interactively display a number of different clusters 250 all derived from the same visual media collection 150, where the display of each cluster 250 graphically indicates associations of the visual media files 134 with different visual features 232, and/or interactively display graphical representations of similarity measures computed for each of the visual media files 134 with respect to each of the different clusters 250. Some examples of graphical representations include thumbnail images, where the size of the thumbnail image may be indicative of a similarity measure (e.g., a larger size may indicate a higher degree of similarity), or the arrangement of images may be indicative of a similarity measure (e.g., images that are more similar with respect to a certain similarity measure are displayed adjacent one another with less similar images displayed further away). The visual search interface module 114 displays image search result sets 254 as, for example, ordered lists of thumbnail images.

The system 100 can engage in iterative exploration 116 (e.g. time-dependent sequences of cues/requests 118 and responses 120) to, among other things, alternate between the clustering interface module 112 and the visual search interface module 114 in order to perform content realization of the visual media collection 150. For example, the system 100 may generate and display an initial set of clusters 250 for the user to peruse. The user may select one of the clusters 250 to explore further by, for example, initiating a clustering operation with different cluster criteria or by requesting an image search. For instance, the user may find an image of particular interest in one of the clusters 250 and then add the selected image to a query to search for other similar or matching images in the collection 150. Similarly, after viewing the results of a visual search, the user may select an image from the result set 254 and initiate clustering of the collection 150 on a feature of the image selected from the result set 254.

The iterative exploration 116 can also include iterative clustering or iterative searching. For example, the system 100 may initially generate a cluster 250 of visual media files 134 having a visual feature that belongs to a certain category (e.g., vehicle, people, logo, etc.). In viewing the cluster 250, the user may wish to re-cluster the files 134 at a higher or lower level of abstraction relative to the initial cluster (e.g., if the initial cluster is on "vehicles," the system 100 may subsequently cluster on "modes of transportation" (higher-level category) or "trucks" (lower-level category) (e.g., iterate between sub-clusters and super-clusters). As another example, the system 100 may create a cluster 250 containing files 134 that depict a distinctive visual feature, such as a logo, a trademark, a slogan, a distinctive object, a distinctive scene, a distinctive person, or a distinctive pattern of imagery. The user may initiate further clustering to show only those files 134 in which the distinctive visual feature is shown in a particular context (e.g., the feature is printed on clothing worn by people playing a certain sport), or to show only those files in which the distinctive visual feature has a particular attribute (e.g., size, shape, location, color, or texture)—for example, to include images in which a coffee company logo is shown on a building, or images in which the logo is small in relation to the size of the image as a whole.

The visual content realization cue/request 118 may be embodied as any suitable form of implicit or explicit input, and may be user-supplied or system-generated. For example, a cue to initiate clustering of the collection 150 may be the user selecting on his or her personal computing device a folder containing image files, or the user selecting a thumbnail of a specific "probe image" displayed on a display device of the computing system 100. Similarly, a search request may be initiated by, for example, selecting a "query image" for which matching images are desired to be found, by inputting a query (e.g. spoken or text natural language), or any other suitable methods of requesting a search of the collection 150.

A multi-dimensional cue/request handler 126 of the cue/request and result set processor module 124 processes the cue/request 118 to mediate between heterogeneous data representations, as needed. For example, an appropriate system response to the cue/request 118 may involve iteratively analyzing, searching, and/or clustering image content at multiple different levels of abstraction (e.g., low-level visual features, semantic features, and image-feature relationships). The multi-dimensional cue/request handler 126 processes the cue/request 118 to determine a multi-dimensional strategy for responding to the cue/request 118 and annotates or otherwise modifies the cue/request 118 with the multi-dimensional strategy information. A simple example of the operation of the multi-dimensional cue/request handler 126 is as follows. Suppose a user's cue/request 118 specifies: "find all pictures of me with my new Honda." The computing system 100 can approach the task of finding the relevant pictures in a number of different ways. The system 100 may first generate or locate a cluster of images in the collection 150 that have been classified as containing "people," at a semantic level. Next, in order to find images in which the user is depicted, the system 100 may search, within the "people" cluster, for visual features that match (e.g., within a specified degree of confidence) the user's physical attributes. Then, within the set of images likely depicting the user, the system 100 may utilize image-feature relationship data to find images in which both the user and a car are depicted. Finally, within the set of images likely depicting both the user and a car, the system 100 may conduct a search for images containing visual features that match the user's Honda (e.g., color, shape, etc.). The cue/request handler 126 may specify the foregoing steps as a strategy for responding to the cue/request 118, where the strategy may be implemented as a set of computer instructions that the cue/request handler 126 associates with the cue/request 118. Alternatively or in addition, the cue/request handler 126 may specify a strategy that responds to the cue/request 118 by first creating a "vehicle" cluster of images in the collection 150, searching for visual features matching the user's Honda, and then, within the set of images likely depicting the user's Honda, look for images that also depict the user. In any event, the cue/request handler 126 creates a multi-dimensional cue/request 128 representing the cue/request 118 and a strategy (or multiple strategies) for responding to the cue/request 118, and passes or otherwise makes the cue request 128 available to the visual content understanding subsystem 132 for processing as described in more detail below.

In response to the multi-dimensional cue/request 128, the visual content understanding subsystem 132 generates one or more clusters 250 and/or search result sets 254 from the contents of the visual media collection 150. The visual content understanding subsystem 132 also assigns the semantic labels 136 to visual media files 134 (e.g., as meta tags that may be stored with or appended to the files 134). The visual content understanding subsystem 132 may perform the content realization operations disclosed herein, such as eliciting visual features 232 and assignment semantic labels 136, offline, e.g., as part of an initialization procedure or as periodic background processing, or may perform such operations interactively in response to cues/requests 128.

The visual content understanding subsystem 132 generates intermediate result sets or responses 130 to the multi-dimensional cues/requests 128, which it passes back or otherwise makes available to the cue/request and result set processor module 124. The intermediate responses 130 include one or more intermediate clusters 250 and/or image search result sets 254, and/or other information. For instance, in the query scenario described above, the intermediate responses 130 include the "people" or "vehicle" clusters and the "like user" and "Honda" result sets generated from those clusters, e.g., those clusters and search result sets that are formulated during the process of achieving a final result set that is responsive to the cue/request 118. The cue/request and result set processor module 124 processes the intermediate result sets, or responses 130, to create a final result set or response, 120. To do this, the module 124 or the cue/request handler 126 may select the most recently-generated cluster or result set. In some cases, the module 124 or the cue/request handler 126 may "fuse" one or more of the visual features depicted by the intermediate result sets/responses 130, using mathematical fusion techniques, to create, e.g., a "super" cluster of images containing a similar combination of different features (e.g., all images of a young man standing next to a red car). The cue/request and result set processor module 124 passes or otherwise makes the response 120 available to the visual content realization interface module 110, which displays the response 120 to the user, e.g., by the clustering interface module 112 or the visual search interface module 114. The response 120 may be embodied as, for example, a search result set, e.g., a ranked or ordered list of images, or a cluster of images, where the images in the cluster contain one or a combination of similar visual features, or a combination of one or more result sets and clusters.

Referring now in more detail to FIG. 2, an embodiment of the visual content understanding subsystem 132 is shown in greater detail, in the context of an environment 200 that may be created during the operation of the computing system 100 (e.g., a physical and/or virtual execution or "runtime" environment). The visual content understanding subsystem 132 and each of the modules and other components of the visual content understanding subsystem 132 is embodied as a number of machine-readable instructions, data structures and/or other components, which may be implemented as computer hardware, firmware, software, or a combination thereof.

Visual Feature Computation

A multi-dimensional feature computation module 212 executes the feature detection algorithms 214 on the input images 210 to elicit the visual features 232. In some embodiments, the feature computation module 212 selects the particular algorithms 214 to be used based on one or more feature selection criteria. For example, the feature computation module 212 may select particular algorithms 214 based on a type or characteristic of the visual media collection 150, or based on requirements of the particular implementation of the computing system 100.

Using the output of the feature detection algorithms 214, the feature computation module 212 performs semantic reasoning using the feature models 216 and the semantic label database 224 to recognize and semantically classify the elicited visual features 232. Based on the semantic reasoning, the feature computation module 212 determines the semantic labels 136 with which to associate the images 210 and assigns semantic labels 136 to the visual media files 134. As described in more detail below, the feature detection algorithms 214 include, for example, computer vision algorithms, machine learning algorithms, and semantic reasoning algorithms.

The input images 210 of the visual media files 134 depict visual imagery that, implicitly, contain information about many aspects of the world, such as geographic locations, objects, people, time of day, visual patterns, etc. To capture the diversity and richness of the visual imagery, and in order to elicit information from the imagery that is useful for a variety of different applications, the feature computation module 212 utilizes a variety of different feature detection algorithms 214 to detect low, mid and high level features that, alone or in combination, can be used to represent various aspects of the visual content of the images 210 in semantically meaningful ways. The feature detection algorithms 214 (or "feature detectors") generate outputs that may be referred to as feature descriptors. Some examples of feature descriptors include color, shape, and edge distributions, Fisher vectors, and Vectors of Locally Aggregated Descriptors (VLADs). Some feature detection algorithms 214 perform image parsing or segmentation techniques, define grids, or identify regions of interest or semantic entities depicted in the images 210.

In more detail, feature detectors 214 can be point-like (e.g., Scale Invariant Fourier Transform or SIFT, Hessian-Affine or HA, etc.), region-like (e.g., grids, regions-of-interest, etc., such as those produced by semantic object detectors), or produced by segmentations of an image. The feature detectors 214 can have different types of associated feature descriptors. Examples of feature descriptors include SIFT, HoG (Histogram of Gradient), Shape Context, Self-Similarity, Color Histograms, low/mid/high-level features learned through, e.g., a convolutional and deep structure network, Textons, Local Binary Patterns, and/or others. In some cases, feature descriptors can be obtained as outputs of discriminative classifiers. Table 1 below lists some illustrative and non-limiting examples of feature detectors 214 and associated feature descriptors, detector types and methods of feature aggregation (where, in some cases, the feature detector 214 and its associated descriptor are referred to by the same terminology).

TABLE 1

Examples of Feature Detectors.

| Detector | Descriptor | Type | Aggregation |
| --- | --- | --- | --- |
| HA | SIFT | Pointlike | BoW |
| HA | ShapeContext | Pointlike | BoW |
| HA | SSIM | Pointlike | BoW |
| HA | VLAD/SIFT | Pointlike | Global |
|  | GIST | Global | Global |
|  | ColorHist (Lab) | Grid | BoW |
|  | ColorHist (Lab) | Global | Global |
|  | CNN L5 | Global | Global |
|  | CNN FC6 | Global | Global |
|  | CNN FC7 | Global | Global |
|  | CNN FC8 | Global | Global |
|  | CNN L4 | Global | Global |
|  | Textons | Grid | BoW |
|  | FisherVector | Grid | BoW |
|  | VLAD/SIFT | Grid | BoW |
| SelectiveSearch | FisherVector | Region-of-Interest (ROI) | BoW |
| SelectiveSearch | VLAD | ROI | BoW |
| SelectiveSearch | ColorHist (Lab) | ROI | BoW |
| SelectiveSearch | Textons | ROI | BoW |
| SelectiveSearch | CNN XXX | ROI | BoW |

As indicated by Table 1, the visual features 232 can be aggregated and classified using, e.g., a Bag-of-Words (BoW) model in which image features are treated as "visual words." The bag of words model represents the occurrence counts of the visual words in a vector or histogram. "Global" descriptors represent properties of the image structure as a whole rather than specific points or regions of interest. Pointlike and region of interest (ROI) descriptors represent image properties of a particular localized portion of the image.

Semantic features can be obtained in a number of different ways. For instance, regions corresponding to specific object classes such as faces, people, vehicles, bicycles, etc. can be computed by applying any of a number of object detection algorithms. For each of the detected regions, features can be computed that are descriptive of the object class represented by that region. For instance, for faces, Fisher Vector features may be computed; for human forms color histograms associated with body parts such as torso, legs, etc., may be computed, and for vehicles, features corresponding to each vehicle part can be computed. Learned low, mid and high level descriptive features can be derived from a convolutional deep neural network trained using supervised large scale datasets such as ImageNet and Pascal. Any of these and/or other features can be indexed as described herein and used for clustering and search.

With regard to visual media files 134 that contain video or animated sequences of images, both static and dynamic low-level visual features can be detected by the feature detection algorithms 214. Static visual features include features that are extracted from individual keyframes of a video at a defined extraction rate (e.g., 1 frame/second). Some examples of static visual feature detectors include Gist, SIFT (Scale-Invariant Feature Transform), and colorSIFT. The Gist feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects. Dynamic visual features include features that are computed over x-y-t segments or windows of a video. Dynamic feature detectors can detect the appearance of actors, objects and scenes as well as their motion information. Some examples of dynamic feature detectors include MoSIFT, STIP (Spatio-Temporal Interest Point), DTF-HOG (Dense Trajectory based Histograms of Oriented Gradients), and DTF-MBH (Dense-Trajectory based Motion Boundary Histogram).

Some additional examples of feature detection algorithms and techniques, including low-level, mid-level, and semantic-level feature detection and image recognition techniques, are described in Cheng et al., U.S. Utility patent application Ser. No. 13/737,607 ("Classification, Search, and Retrieval of Complex Video Events"); and also in Chakraborty et al., U.S. Utility patent application Ser. No. 14/021,696, filed Sep. 9, 2013 ("Recognizing Entity Interactions in Visual Media"), Chakraborty et al., U.S. Utility patent application Ser. No. 13/967,521, filed Aug. 15, 2013 ("3D Visual Proxemics: Recognizing Human Interactions in 3D from a Single Image"), Han et al., U.S. Pat. No. 8,634,638 ("Real-Time Action Detection and Classification"), and Eledath et al., U.S. Pat. No. 8,339,456 ("Apparatus for Intelligent and Autonomous Video Content and Streaming, all of SRI International and each of which is incorporated herein by this reference.

The semantic labels 136 produced by the feature computation module 212 semantically describe visual content depicted by the input images 210. In the illustrative embodiments, the semantic labels 136 are determined algorithmically by the computing system 100 analyzing the input images 210. A semantic label 136 may be embodied as, for example, a natural language word or phrase that is encoded in a tag or label, which the computing system 100 associates with the input images 210 (e.g., as an extensible markup language or XML tag). Alternatively or in addition, the semantic labels 136 may be embodied as structured data, e.g., a data type or data structure including semantics, such as "Logo (coffeeco, mug, small, lower left corner)" where "logo" is a semantic entity, "coffeeco" identifies the specific logo depicted as belonging to a particular coffee company, "mug" indicates an object depicted in the image in relation to the logo, "small" indicates the size of the logo in relation to the image as a whole, and "lower left corner" indicates the location of the logo in the image.

To generate the semantic labels 136, the feature computation module 212 uses the feature models 216 and semantic label database 224 to map the visual features 232 to semantic descriptions of the features 232 maintained by the semantic label database 224. The feature models 216 and the semantic label database 224 are each embodied as software, firmware, hardware, or a combination thereof, e.g., a searchable knowledge base, database, table, or other suitable data structure or computer programming construct. The semantic label database 224 may be embodied as, for example, a probabilistic SQL database, and may contain semantic labels representative of visual features or combinations of visual features, e.g., people, faces, vehicles, locations, scenes, as well as attributes of these labels (e.g., color, shape, size, etc.) and relationships between different semantic labels (e.g., person drives a vehicle, person wears a hat, etc.).

The low level feature model 218 defines (e.g., by rules or probabilistic classifiers) relationships between sets or combinations of low level features detected by the algorithms 214 with semantic descriptions of those sets of features (e.g., "object," "person," "face," "ball," "vehicle," etc.). The mid-level feature model 220 defines (e.g., by rules or probabilistic classifiers) relationships between sets or combinations of features detected by the algorithms 130 and semantic descriptions of those features at a higher level of abstraction, such as people, objects, actions and poses (e.g., "sitting," "running," "throwing," etc.). The high-level feature model 222 defines (e.g., by rules or probabilistic classifiers) relationships between sets or combinations of features detected by the algorithms 130 and semantic descriptions of those features at a higher or more complex level, such as semantic attributes or combinations of semantic attributes and semantic entities or semantic types (e.g., "person wearing red shirt"). The semantic labels corresponding to the various combinations of visual features 232 include entities 226 (e.g., "car,"), types 228 (e.g., "vehicle"), and attributes 230 (e.g., "red"). The semantic labels 226, 228, 239 and the relationships between the different semantic labels (e.g., a car is a type of vehicle, a car can be red) are maintained by the semantic label database 224. As described in more detail below with reference to FIG. 5, the relationships between different combinations of features, semantic labels, images, and similarity measures may be implemented using an ontology 500.

Visual Feature Indexing

Referring now to the visual feature indexing module 234, the visual features 232 detected by the feature computation module 212, including semantic entities, types and attributes, as well as non-semantic visual features (e.g., low or mid-level features), are indexed with a variety of visual feature indices 240. In the illustrative embodiments, the visual features 232 are represented as high-dimensional vectors. Accordingly, each feature descriptor can be represented as a point in Euclidean P-dimensional space ($R^P$). Indexing partitions the descriptor space ($R^P$) such that a query can access each image 210 and its associated features 232 efficiently from the collection of visual media 150.

The illustrative indexing module 234 indexes each of the visual features 232 into a visual feature index 240, which is, illustratively, embodied as a tree-like structure. To do this, the indexing module 234 executes methods of random subspace projections and finding separating hyperplanes in high-dimensional subspaces. As a result, the indexing module 234 generates index forests that implicitly capture similarities between features 232 within an image 210 and across the whole image dataset 150. For instance, features 232 contained in any leaf node of an index tree are considered similar and may correspond to many different images 210 in the dataset 150 (including images 210 in the same visual media file 134 or different visual media files 134). The index trees further enable efficient finding of approximate nearest neighbors to a query feature. For example, using the approximate nearest neighbor search for a feature 232, the nearest neighbors for any query image can be computed in constant time without the need to do a linear search. Additionally, the index trees reduce the complexity of finding pairwise similarities for images for a large dataset, allowing the N×N similarity matrix for a large dataset to be computed nearly "for free" once the indexing trees are constructed.

In some embodiments, the indexing module 234 performs the visual feature indexing during an offline indexing phase, and the resulting visual feature index is subsequently used for visual searches and clustering episodes. To perform the offline indexing phase, the indexing module: (i) creates index trees with various visual features 232 typically with some quasi-invariance properties; (ii) indexes various types of features 232 in order to capture rich visual properties of image scenes; (iii) utilizes highly scalable data structures that can scale up to billions of images and features, as needed; and (iv) utilizes parallel and distributed computation for large scalability, as needed.

To do this, the indexing module 234 utilizes indexing algorithms and templates 236 as described below. The indexing algorithms 236 create an index 240 that is composed of several randomized trees (typically N=4). At each internal node of a tree, a decision is made based on the visual feature 232 being searched. The leaf node of a tree represents a set of features 232 and the associated images 210 that contain those features 232. The index tree and the associated information for node decisions and for the leaf nodes are created by the indexing algorithms 236.

The indexing module 234 constructs each index tree using, e.g., Hierarchical K-Means (HKM) clustering applied to a subset of the visual features 232 on the basis of which first an index template 236 of an index tree is created. The index template 236 is then used to index all of the features 232 in the collection 150. Each index tree has two parts: index hashes and an inverted file. The index hashes and inverted file are computed independently of each other. Index hashes are independent of the images 210 and represent the multi-way decisions that an index tree encodes for creating an index. The inverted file contains for each leaf node a list of (ImageId, FeatureId) tuple that encodes the feature 232 and the image 210 that the leaf node represents. For the index trees, the indexing module 234 uses a fanout of, e.g., F=16 and depth D=6 (which corresponds to approximately 106 inverted file leaves). An index tree with only hashes (no images in the inverted file) can be used as a blueprint or a template to which image features 232 can be added later.

As noted above, the indexing module 234 divides the indexing process into two parts: index template creation, and index creation. In some embodiments, the indexing module 234 creates a "generic" index template, e.g., as an offline process, for the collection 150 and/or other datasets, without reference to a specific dataset that needs to be indexed. In any case, the index template 236 is a representation of features 232 in a large class of images 210 on the basis of which optimal partitions of the features can be done at every node. For example, the indexing module 234 may use on the order of about 50 million features for training and index template creation. The features 232 used for index template creation can be computed from within the target dataset (e.g., the collection 150) to be indexed or may be computed from some "background" image set which is representative of all or most datasets that will need to be indexed by the system 100. Since the index template does not need to store any indexed image set, the inverted file part of an index at the leaf nodes is empty.

Depending on the fanout at every node, the indexing module 234 creates K-means clusters that are used to make a decision on which path the features 232 from an index set will take in the tree. To account for arbitrary boundaries between neighboring features generated by the HKM process, the indexing module 234 introduces randomness in defining the features 232. To do this, the indexing module 234 uses random projections to first map each feature 232 into a space where the feature dimensions can get decorrelated. For each of the four trees in the illustrative index forest, a different random projection is used before employing HKM. As a result, each index tree captures a different partitioning of the high-dimensional space.

The illustrative indexing module 234 executes an index template creation process that is fully parallel in that each tree is created in parallel. To do this, the indexing module 234 utilizes, e.g., OpenCV2.4.5, which parallelizes K-Means using, e.g., OpenMP and Intel TBB (Threading Building Blocks) to exploit multi-CPU and multi-core parallelism.

The indexing module 234 uses the index template created as described above to populate the forest with features 232 elicited from the collection 150 by the feature computation module 212. In this process, the indexing module 234 indexes each feature 232 from each image 210 into each of the index trees in the forest to find its appropriate leaf node. At the leaf node, the (featureID, imageID) information is stored.

For each of the feature descriptors stored at a leaf node in the tree index, the indexing module 234 computes a weight that accounts for the saliency and commonness of any given feature 232 with respect to the whole visual media collection 150. Such a weight is useful both in computing weighted feature similarity between any two images in the collection 150 for the purposes of clustering, as well as for computing a similarity measure between a query image and an image in the collection 150, where the similarity measure is used to rank the images 210 in the collection 150 with respect to the query image.

Algorithm 1 below describes an illustrative weighting scheme that can be executed by the indexing module 234. Other methods of computing saliency of features 232 and groups of features 232 can also be used.

---

Algorithm 1: Illustrative weighting scheme for similarity computation for clustering and search.

For a descriptor vector y, let $\alpha_1, \ldots, \alpha_s$ denote the reference images having
descriptors mapped at inverted file pointed by leaf $v_{j_1}$
For each image $\alpha_i$ we vote with a weight $w_i$ that is computed as $$w_i = n_i \omega_i \mathrm{idf}(v_{j_1})$$

$$\omega_i = \sqrt{\frac{\sum_{v \in \psi(y)} \mathrm{idf}(v)}{\sum_{v \in \psi(y)} n_{\alpha_i}(v) \mathrm{idf}(v)}}$$

Where $n_i$ are the number of descriptors from image $\alpha_i$ existing in the inverted
file, $\mathrm{idf}(v_{j_1})$ is the inverted term frequency computed as $$\mathrm{idf}(v_{j_1}) = \log\left(\frac{\text{Num Images}}{\text{Num Images at node} v_{j_1}}\right)$$

and $n_{\alpha_1}(v)$ is the number of descriptors from image $\alpha_i$ that are mapped at a
node v
Finally the images are sorted in decreasing order of their accumulated scores

---

The "idf" (inverse document frequency) term in the weights accounts for the high prevalence of features 232 within an image 210 and across images 210 in the collection 150. For instance, if there are too many images 210 with grassy patches, features on these patches are not informative for determining similarity and differences between images. Accordingly, the illustrative weighting scheme of Algorithm 1 down weights such features.

In some embodiments, the indexing module 234 stores the index hashes in random access memory of a computing device of the computing system 100, while the inverted files are written to disk. In some embodiments, the indexing module 234 optimizes inverted file accesses on disks by distributing the inverted file data on multiple machines of the computing system 100, e.g., by using a distributed file system such as HBase.

In order to cluster images 210 based on content similarity, the image similarity computation module 242 computes a pairwise similarity matrix across the collection 150 as described in more detail below. To enable this computation to be performed efficiently, the image similarity computation module 242 can exploit the structure of the inverted files created by the indexing module 234 to compute M nearest neighbors for every image 210 in the collection 150 in O(N log N) time after the index 240 has been created. The inverted files represent images as bags of visual words (BoVW). Thus, for N images, each with M features and an inverted file structure with P files, for any given BoVW, only M out of P entries are non-zero. Accordingly, the resulting BoVW representation is a very sparse representation.

In creating the inverted file using the representation described above, the indexing module 234 ensures that images 210 containing similar features will "collide" and be present in the same leaf node and hence the same inverted file structure for that leaf node. As a result, for similarity computation by the module 242, similarity across the whole collection 150 can be computed efficiently. The visual feature indices 240 allow the similarity computations to be performed much more efficiently than brute force methods that compute direct similarity between two images. For example, in a parallel implementation on an exemplary 32-core Intel-based machine, the similarity matrix for 250,000 images can be computed in about 30 minutes. In contrast, a brute force computation that takes 1 millisecond per pair would take over 400 hours for the full quarter million set on the same hardware.

In some embodiments, an aggregated representation of images such as Fisher Vectors and/or VLAD are used, alternatively or in addition to the BoVW representation. These aggregated feature representations encode higher order statistics of a set of image features. Thus, the resulting descriptor is higher dimensional than the dimensionality of the constituent features. For instance, a typical SIFT feature is 128 dimensional while a Fisher Vector descriptor can be as high as 4K or 8K dimensional. Since a single Fisher Vector descriptor can be used to represent an image, efficient coding techniques can be used to represent images and may enable similarity to be computed more efficiently.

In some embodiments, the indexing module 234 implements the index 240 separately from the associated inverted file, thereby facilitating switching from an in-memory inverted file to an offline inverted file, as needed. The use of multiple randomized trees in the index 240 can improve image retrieval because quantization errors in one hierarchical clustering can be overcome by other subspace projections. In some implementations, the indexing module 234 creates the index trees without relying on pointer arithmetic. For example, the indexing module 234 may, for each node in the tree, store just a few integers: the id of the node (self), the id of the parent, the id of the first child and the id of the last child (assuming that that all children are stored contiguously in memory). In addition, as discussed above, each index can be trained once (using, e.g., an index template) and can be reused to add images to its inverted file.

Image Similarity Computation

The image similarity computation module 242 executes a number of similarity functions 238 to create an image similarity matrix 244. As discussed above, some embodiments of the image similarity computation module 242 utilize the visual feature indices 240 to avoid having to compute a full N×N similarity matrix for a set of N images. Rather, some embodiments of the module 242 create a much sparser matrix that contains, e.g., up to M-nearest neighbors for any image. As a result, the computation of the similarity matrix reduces from $O(N^2)$ to $O(N \log N)$; where log N is the complexity of nearest neighbor search. The log N complexity for search is made possible by the indexing algorithms and feature representations described above.

Further, the similarity computation module 242 can exploit the neighborhood similarity structure of the visual media collection 150 that is already contained in the indexing data structures 240 to compute the similarity matrix in O(N). To spread the influence of similarities obtained from M-nearest neighbors, the similarity computation module 242 and/or the clustering module 246, described below, employs graph based diffusion so that similarity amongst non-mutually similar neighbors can be exposed. The similarity computation module 242 and/or the clustering module 246 can use the graph based diffusion to produce similarities that are longer range than nearest neighbors. The image similarity computation module 242 and/or the clustering module 246 can also employ optimized computation of the dominant Eigenvector to incrementally tease out clusters ordered from high confidence clusters to lower confidence clusters.

The illustrative image similarity computation module 242 represents the collection of visual media 150 as a graph in which the nodes represent images and the edges (node-node connections) represent a measure of similarity between the images represented by the connected nodes. As discussed above, the image similarity computation module 242 defines "similarity" to highlight various kinds of visual content in the images 210 by computing appropriate features 232 and by computing appropriate similarity measures with the features 232. As the features 232 each highlight different visual characteristics of the images 210, the image similarity computation module 242 defines and executes different similarity functions 238 to aggregate the features in various ways. As a result, the similarity computation module 242 can capture patterns across images 210 that characterize, e.g., sameness/similarity of scenes, objects, weather, time, etc. The graph based representation produced by the illustrative image similarity computation module 242 enables the clustering algorithms 248 to work with any similarity measures across all of the features 232. In other words, some embodiments of the computing system 100 do not need to use different clustering algorithms 248 for different features 232.

As discussed above, in some embodiments, the graph-based representation produced by the module 242 is not complete but only contains edges corresponding to nearest neighbors of an image 210. Accordingly, the resulting similarity graph is very sparse; e.g., every image has at most M<<N neighbors. The similarity computation module 242 represents the image similarity graph mathematically as a sparse similarity matrix in which each row corresponds to an image and the entries in each row are the similarities S(i,j).

Visual Content-Based Clustering

The clustering module 246 executes the clustering algorithms 248 using the feature indices 240 generated for the collection 150, the pairwise similarity matrix 244 computed as described above, and clustering criteria 248 (if any), to generate clusters 250 of the visual media files 134 based on the visual features 232. The illustrative clustering module 246 can generate a number of different clusters 250 for each visual feature 232, where each cluster 250 contains images 210 that are highly similar with respect to one of the visual features 232, e.g., some visual content of the images 210.

For instance, different clusters 250 may capture different types of similarity with respect to scenes, locations, distinctive visual features such as logos, common visual patterns or regions of interest, person, scene or object appearance characteristics or attributes, image type (e.g., image of a document vs. a photograph), and/or other features 232 or combinations of features 232 (including different combinations of low level, mid level, and high level features). As a result, the clustering module 246 allows the user to explore the collection 150 in a highly visual way along multiple different visual content dimensions, even if the user knows little or nothing about the contents of the collection 150. For instance, for a personal album containing vacation photos, the clustering module 246 may automatically generate content-based "dossiers" that organize the photos according to locations visited (e.g., beach, restaurant, etc.), people (e.g., friends, family), or objects seen in the photos (e.g., fishing boat, lighthouse, etc.). As another example, a law enforcement user may discover that a collection found on a confiscated device contains a cluster 250 of pictures of a particular site in a particular city of interest. Further, a trademark monitoring professional may find a cluster 250 of images containing a particular type of logo in a large, unordered collection 150. A consumer working with a personal photo album may be pleasantly surprised to see her collection automatically organized into content-based clusters 250 of places visited, people versus non-people clusters, etc.

As used herein, "cluster" may refer to, among other things, a group of images having one or more coherent properties or visual patterns in common. Examples of clusters include groups of images that: (i) are duplicates, (ii) depict the same geographic location or buildings, with similar viewpoints, (ii) depict the same logos or distinctive markings in a cluster, (iii) depict distinctive objects, such as particular vehicles or weapons, (iv) depict people or objects having specific attributes in common (e.g., age, size, hair color), (v) depict scenes having the same time of day, season, weather, or other scene attributes, and (vi) depict the same type of scene, as determined by camera angle or other camera attributes (e.g., wide angle, portrait, close up, etc.). The properties upon which some clusters are created may not be suitable for hierarchical organization. For example, the clustering module 246 may generate a number of distinct, mutually exclusive clusters having no images in common, and/or may generate overlapping clusters that have one or more images in common. That is, the collection 150 may be organized by the clustering module 246 in a number of different ways such that the same image may appear in multiple different clusters 250 based on the presence of different features in the image, or the image may appear in only one of the clusters 250.

Further, the clusters 250 can represent sameness as well as similarity. For example, the clustering module 246 may generate a cluster 250 of images 210 depicting the same (identical instance) vehicle in many different contexts (e.g., images of a suspect's car at multiple different locations); or same locale present in many different contexts (e.g., at sunrise, on a rainy day, after a snowstorm); or the same object from different viewpoints (e.g., the same building from different viewpoints), etc. As a result, the computing system 100 (e.g., the clustering interface module 112) can present the visual media collection 150 to the user through many different parallel and/or hierarchical views.

The clustering module 246 thus can be used to discover similar patterns and themes within an unordered collection of images and videos. The clustering module 246 can perform clustering with a single feature by selecting a clustering algorithm 248 that partitions an N-set into disjoint sets. The clustering module 246 can perform clustering with multiple features by selecting a clustering algorithm 248 that divides an N-set into potentially overlapping sets.

Traditional methods for clustering require the number "K" of desired clusters to be produced by a clustering algorithm to be specified a-priori. The clustering algorithms then partition the collection into K sets, where K is the pre-specified number of desired clusters. This traditional method falls short when K is unknown, as may be the case where the user has no or limited knowledge of the contents of the collection 150.

The illustrative clustering module 246 computes the clusters 250 for the collection 250 using spectral graph clustering algorithms. The spectral graph clustering algorithms 248 compute the Eigen-structure of the N×N similarity matrix 244 and subsequently employ K-means clustering on the Eigen-structure. In doing so, the illustrative clustering module 246 computes the clusters 250 one at a time, with high affinity clusters emerging early in the process. High affinity clusters include images 210 that have the same or similar themes and patterns at a high degree of precision. To implement an incremental one-at-a-time cluster computation, the clustering module 246 computes the dominant Eigenvector of the similarity matrix 244, as described in more detail below.

The clustering module 246 configured as described herein allows the number of clusters, K, to be changed without affecting previously-created clusters. This is in contrast to traditional methods in which increasing the number of clusters from K to K+1 globally changes the composition of all of the clusters. As a result, the clustering module 246 can terminate the process of clustering at any K, e.g., to get the "best" K-cluster results or for other reasons. Additionally, the clustering module 246 uses iterative spectral clustering to recursively obtain clusters 250 from the similarity matrix 244. After every iteration, graph diffusion is performed so that the nodes in the current cluster 250 are removed from the similarity matrix 244 and the remaining graph is used to compute the next cluster 250.

The clustering module 246 uses the Eigenvector decomposition of the similarity matrix 244 to find the most cohesive or "pure" cluster in the similarity graph 244 by finding a cut through the graph. The computing system 100 (e.g., the image similarity computation module 242) represents the similarity matrix 244 as a normalized affinity matrix that is row-stochastic (and non-symmetric). The similarity computation module 242 and/or the clustering module 246 transforms the similarity matrix 244 and then determines the first non-identity Eigenvector computation with O(N) complexity. The Eigenvector computations can be performed using, for example, the householder asymmetric deflation algorithm.

The similarity computation module 242 and/or the clustering module 246 can, with the visual feature indices 240 described above, compute the similarity matrix 244 using, e.g., the householder asymmetric deflation algorithm, and create the image clusters 250 across a large dataset. These techniques allows the computing system 100 to interact with a user to create and browse clusters 250 in interactive time. In embodiments in which the visual feature indices 240 are computed early in the process, the indices 240 can be used for many purposes including clustering, search and other types of exploration and search functions with the features 232 on images and/or videos of the collection 150.

In some embodiments, the visual content understanding subsystem 132 includes a multi-feature fusion component 260 and/or a cluster refinement component 262. The multi-feature fusion component 260 executes data fusion algorithms to fuse selected visual features to create "super" clusters of images in the collection 150. For example, the clustering module 246 may initially cluster images in the collection according to "people," "places," or other categories. The multi-feature fusion component 260 can, in response to a cue/request 118 or automatically, find "intersections" across these clusters using fusion techniques. For example, the multi-feature fusion component 260 may create new clusters of images of specific people at certain locations (e.g., family at the beach, children at grandma's house, etc.).

The cluster refinement component 262 evaluates the coherency or "purity" of the clusters that are generated by the clustering module 246, based on visual features or semantic labels. To do this, the cluster refinement component 262 computes a "purity metric" for each cluster, which gives an indication of the cluster's purity with respect to the collection 150 as a whole. As used herein, "purity" or "coherency" may refer to, among other things, the degree to which images in a given cluster have a common visual feature or semantic label, or set of visual features in common, in comparison to the content of the collection 150 as a whole. The purity metric indicates the degree to which the visual content of a cluster would be intuitively understood by a user, e.g., can the user tell just by looking at the images in the cluster why the computing system 100 clustered these images together? The purity metric may be embodied as a numerical value, e.g., a positive number between 0 and 0.99, where a higher value may indicate a purer cluster and a lower value may indicate a less pure cluster (or vice versa). The computing system 100 can use the purity metric to, for example, remove less-pure images from a cluster, e.g., images that have fewer visual features in common with the other images in the cluster, and return those removed images to the data set as a whole (e.g., the collection 150) for re-clustering (and thereby improve the purity score for the cluster). Alternatively or in addition, the computing system 100 can identify clusters that have a low purity metric and discard those clusters (e.g. return the images in those clusters to the collection 150 for re-clustering).

Figure 6A:
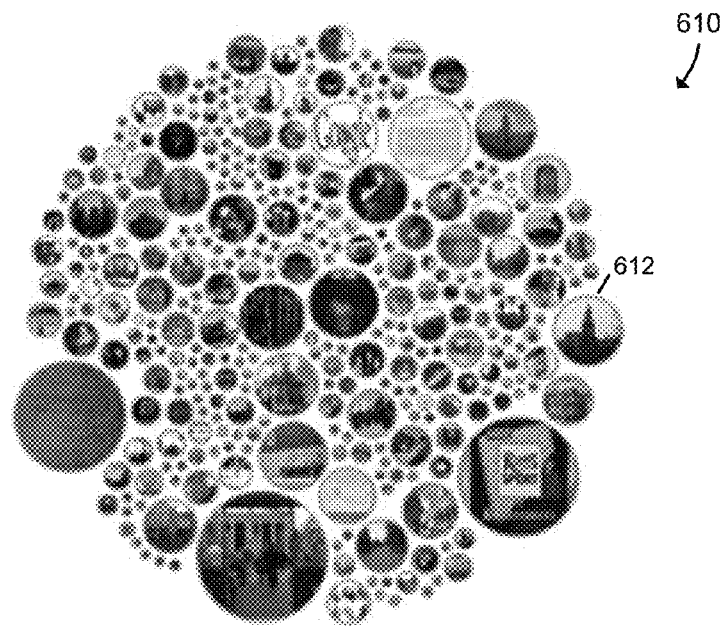
FIGS. 6A-6D are simplified examples of clustering results that may be generated by at least one embodiment of the computing system of FIG. 1.
Figure 6B:
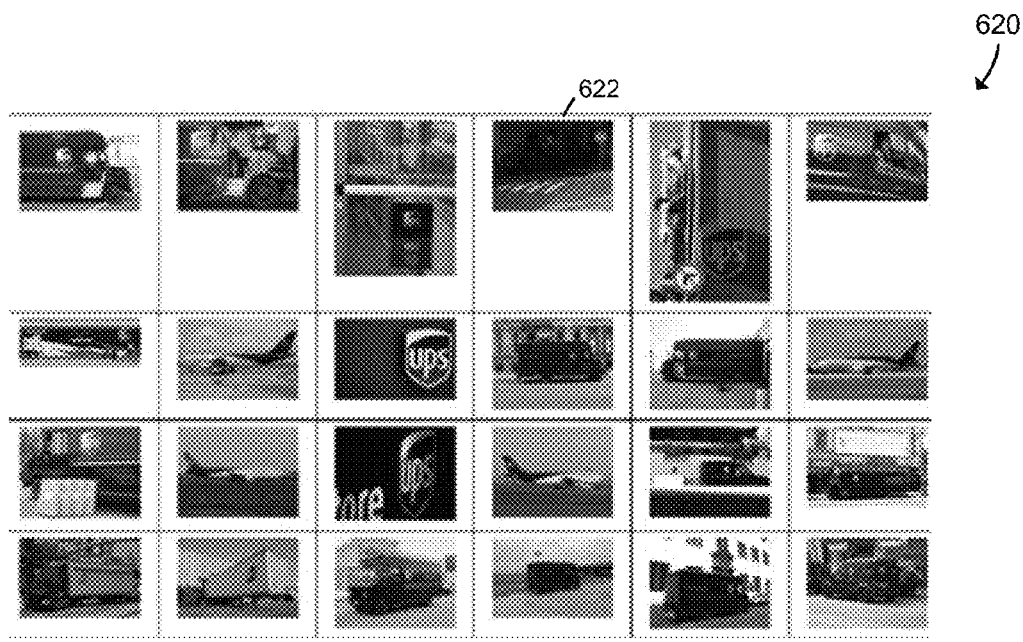

Illustrative examples of output produced by the clustering module 246 are shown in FIGS. 6A-6D. In FIG. 6A, the results of clustering performed by the clustering module 246 on the entire collection 150 are displayed graphically. That is, the graphical representation 610 includes an image 612 (e.g., a thumbnail image) for each cluster 250 created by the clustering module 246 on the collection 150. The relative sizes of the images 612 are indicative of one or more similarity measures or clustering criteria. For example, larger images 612 indicate clusters that contain a proportionally higher number of images 210. The arrangement of the images 612 also indicates neighborliness in terms of one or more similarity measures, e.g., images 612 representing clusters 250 that are placed adjacent one another may have more features 232 in common than clusters 250 that are spaced at a greater distance from one another. In FIG. 6B, the images 210 assigned by the clustering module 246 to one of the clusters 250 shown in FIG. 6A are displayed. In the example, the feature computation module 212 previously elicited a visual feature 232 corresponding to the UPS logo. In response, the clustering module 246 generated the cluster 620, which contains images 622 that depict the UPS logo. As shown in FIG. 6B, the clustering module 246 was able to identify and include in the cluster 620 images showing the UPS logo in different contexts (e.g. on various sizes and shapes of trucks, airplanes, on the side of a building, etc.), at different camera angles and lighting conditions, etc. Thus, FIG. 6B illustrates an example of "instance" clustering, in which the clustering module 246 clusters on features of a localized portion of an image rather than a global descriptor of the entire image.

Figure 6C:
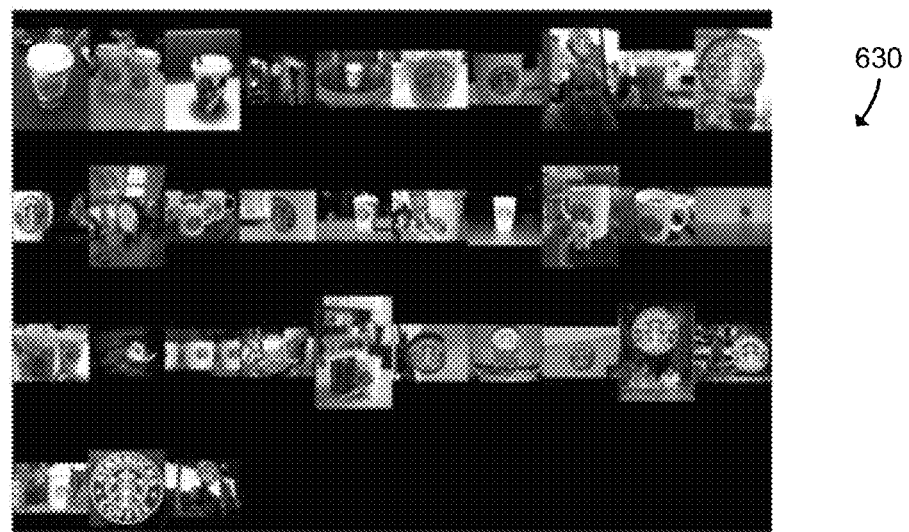
Figure 6D:
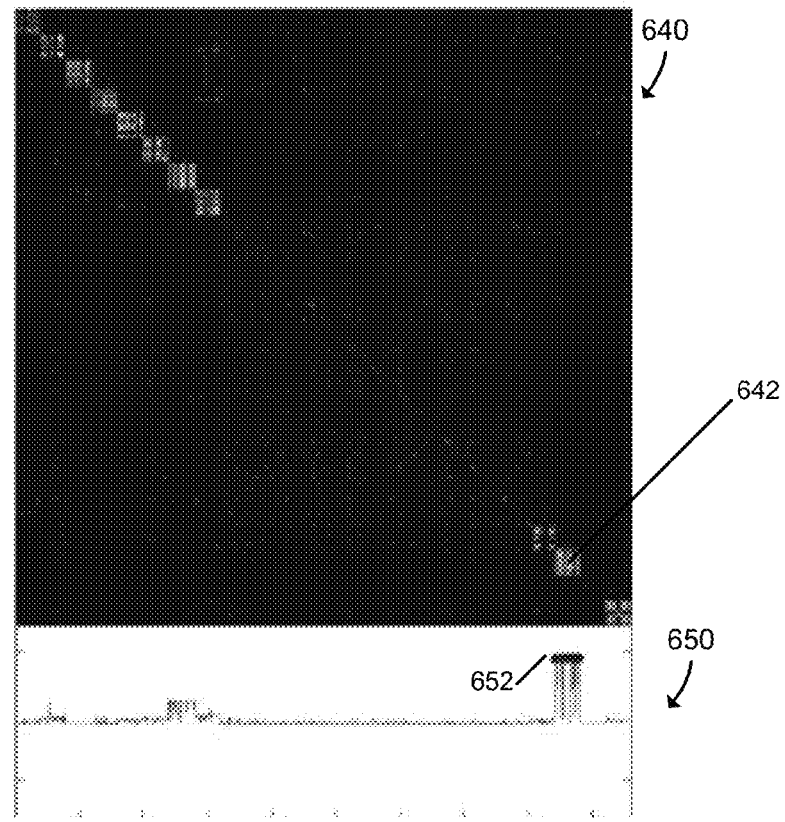

In FIGS. 6C-6D, iterative results obtained from the clustering process performed by the clustering module 246 on a sample dataset 150 are shown. FIG. 6C shows the images in a cluster 250 generated by the clustering module 246, and FIG. 6D shows the successive Eigenvectors and the corresponding image clusters obtained by the clustering module 246. Section 640 of FIG. 6D shows the N×N similarity matrix 244 with bright regions (e.g., region 642) indicating high similarity and dimmer regions showing lower similarity values. Section 650 of FIG. 6D shows the dominant Eigenvector and highlights the values that are detected for the image cluster 640 at 652. Each value in the one dimensional signal (Eigenvector) shown at 652 corresponds to one image and the values that are categorically different from the background values correspond to a cluster. From this set of values, the clustering module 246 can identify values that meet a clustering criterion 248 (e.g., a threshold value) or can fit two distributions to these values, in order to select the images corresponding to a cluster.

The clustering module 246 can apply the processes described above to clusters using an image-to-set similarity measure and a set-to-set similarity measure, e.g., to further find larger clusters that improve the recall for clusters in a dataset. On the other hand, for many applications, users may be satisfied with getting high quality pure clusters, e.g., to get an initial sense of what is in the data set, and then use visual search with probe images to obtain a more complete set of the data of interest for a particular type or pattern of visual features. Other capabilities of the clustering module 246 include: (i) the ability to handle affinities (similarities) from multiple features in the same framework by combining the edge weights from individual similarity graphs. As a result, the clustering module can cluster on single features or a set of features without modifying the framework; (ii) the ability to use geometrically verified image similarities on top of the visual feature similarities to, e.g., fine-tune the clusters 250. For instance, to capture similarity between images of scenes and three dimensional (3D) objects, the clustering module 246 can consider the image layout and two dimensional (2D)/3D geometric constraints in addition to appearance similarities captured by the visual features 232. Matching can be done for geometric layout or more generally for features of the topological, geometric, and/or relational layout of an image. For example, the system 100 can handle match criteria such as "sky is on top of the image while road and vehicle are below," or "the logo is on the top left of the building;" (iii) the ability to incorporate user input/feedback into the iterative process to, e.g., bias the output towards user-chosen clusters. For instance, users can specify a set of images as forming a cluster or sets of clusters. This human-specified implicit similarity information can be incorporated into the similarity graph to bias the obtained clusters to match human-specified similarities; (iv) the ability to discover similarities over time from user queries against the collection 150. For instance, as users provide probe images or query images on the basis of which the computing system performs visual search, and users provide further relevance feedback on ranked similarities between probe images and images in the search result set 254, the system 100 can incorporate this information into future clustering and/or search processes.

Visual Search

The visual search module 252 is responsive to cues/requests 118 that are submitted as search requests, or queries. For example, when a user submits one or more probe images or "query images" as queries (e.g., by the visual search interface module 114), the feature computation module 212 computes the appropriate visual features 232 for the probe image. The visual features 232 of the probe image are used by the visual search module 252 to initially conduct a "coarse search" step in which visual search module 252 searches the respective visual feature indices 240 in constant time to obtain votes for target images 210 in the collection 150. Inverted indices stored in the index trees provide the mapping from features 232 to images 210 in the collection 150 on the basis of which votes for all the images in the collection 150 can be collected by integrating the votes for each probe feature. The vote histogram is then used to create a short-list of the top K (typically 100 or 1000) images in the collection that are strong candidates for matching the probe query image. In some embodiments, the above-described coarse search process may generate a sufficient image search result set 254. The short list is presented to the user (e.g., by the visual search interface module 114) in a ranked order, where the score for the ranking is computed using, e.g., the term frequency-inverse document frequency (tf-idf) weighting of the features 232, which is pre-computed at the time of feature indexing.

In other embodiments, or for particular types of queries, such as scenes and landmarks, the visual search module 252 conducts a "fine search" step in which a geometric verification step is applied to the results of the coarse search. In the fine search step, each of the short-listed images from the collection 150 is matched to the probe image/set using matching algorithms 254, including feature matching and geometric alignment with models such as affine, projective, F-matrix, etc. The resulting geometric match measures are used to present the verified images in a ranked order to the user.

The visual search module 252 utilizes the visual feature indices 240 during at least the coarse search step. As described above, the visual feature indexing module 234 creates index trees for the collection 150, e.g., as an offline process, to create an indexable database of features. In the coarse search step, the features 232 computed in the query image are searched against the index trees to find match measures using the weighted matching described above. In the coarse search step, only the appearance features (e.g., the features that have been indexed offline) are used, and the geometric, topological, relational, or other layout of features in the query image and the images in the collection 150 ("database images") are ignored. As noted above, the coarse search step generates a short list of potential matches for the query image.

In the fine search or "alignment" step, the visual search module 252 matches the query image to each of the short listed images using one or more of the matching algorithms 254. To perform this matching, the visual search module 252 uses geometric models such as affine, projective, fundamental matrix, etc. to align the geometric, topological, relational, or other layout of features in the query image with those in the database images. In the fine search step, the module 252 produces a match measure that accounts for a number of matched features and their characteristics that can be captured as a normalized match measure. The visual search module 252 uses this match measure to produce the image search result set 254, e.g., an ordered list of final matches for the user. Algorithm 2 shown below is an illustrative example of matching algorithms 254 that may be used by the visual search module 252 in the fine search step.

---

Algorithm 2: Correspondence selection and image pair scoring for two images used in the fine search process.

Goal: Given a set of features & descriptors from an image pair Q and R, determine a "strong" set of corresponding descriptors that can be used for geometric validation.

1. Initialize the correspondence set $C_{QS}$ to the empty set.
2. For each feature $q_i$ in the query image Q, determine the two nearest neighbors $r_2$ and $r_2$ from the set of features in the reference image R.
3. Estimate the confidence of the nearest neighbor by estimating:
   $c(i,j) = L2\_DIST(q_i,r_j)/L2\_DIST(q_i,r_j)$
   where $L2\_DIST(a,b)$ is the L2 distance between feature vectors a and b.
4. Add the correspondence $(q_i,r_j)$ to $C_{QR}$, if $c(i,j) < t = 0.9$
5. Repeat steps 1-4 above with Q and R swapped.
6. Initialize the final correspondence sec C to the empty set.
7. For each correspondence $(q_i,r_j)$ in $C_{QR}$, check if there is a member $(r_2 q_i)$ in $C_{RQ}$, if yes, add the correspondence $(q_i,r_j)$ to the final set C.
8. The final set C contains all correspondences which are mutually consistent between the image pair (Q,R) and hence constitutes a strong set of matches.

Goal: Given the set of inliers $C_i$ between image pair (Q,R), compute a score $S_{QR}$ reflecting how well the images Q and R match geometrically.

1. Use the number of inliers as the score directly i.e. set $S_{QR} = |C_F|$.
2. Use the descriptor distance between the inlier correspondences to weigh each correspondence i.e. $S_{QR} = SUM(W(q_i,r_j))$ where $(q_i,r_j)$ is one of the correspondences in the set $C_i$ and the summation SUM(.) is over the entire set of correspondences in $C_P$. The function W converts the diescriptor distance to likelihood: $W(q_i, r_j) = expt-L2\_DIST(q_i, r_j)/sigmo)$ where sigmo is a constant.
3. In addition to (2), weight each correspondence so that descriptor pairs $(q_i, r_j)$ with large difference in the SIFT descriptor orientations are suppressed in the overall scone i.e. $S_{QR} = SUM(W(q_i,r_j) * W_n(q_i, r_j))$ where W(.,.) is defined as in (2) obove and $W_n(q_i, r_j) = expt-L2\_DIST(Angle(q_i).Angle(r_j)))$.

---

As shown above, Algorithm 2 contains steps for addressing two different objectives. The first part of Algorithm 2 (the first 8 steps) identifies a set of features 232 that can be used to perform the geometric validation of a query image against database images as described above. The second part of Algorithm 2 uses the geometric validation feature set determined in the first part of Algorithm 2 to compare the query image to a database image and compute a geometric matching score for the image pair.

Combinations of multiple features 232 capture various attributes of images and objects (shape, color, texture) at multiple different scales. The visual search module 252 can perform visual image searching on combinations of multiple visual features 232 by using image feature fusion techniques. Algorithm 3 below is an illustrative example of a multi-feature fusion technique that may be executed by the visual search module 252.

---

Algorithm 3: Multi-Feature Fusion Search Framework.

For each individual feature we are computing a similarity graph (query + database images)
Each similarity graph can be represented as a sparse transition matrix where the (i, j)entry corresponds to the images indexed by -continued Algorithm 3: Multi-Feature Fusion Search Framework.

i and j
We compute a weighted similarity
matrix by taking the Hadamard
(element-wise) product (o) between
the components of the individual
similarity matrices for each modality
Perform graph diffusion to refine the
results In Algorithm 3, an image-to-image similarity matrix A is computed for each of the k features. The weighted similarity matrix can be represented by the equation: $A = A_1^{\alpha_1} \circ \ldots \circ A_K^{\alpha_K}$. The graph diffusion process can be represented by the equation: $\Sigma_k^K \alpha_k = 1$.

Referring further to FIG. 2, an auto-suggest module 256 leverages the information produced by other modules of the visual content understanding subsystem 132, including the visual features 232, the semantic labels 136, the visual feature indices 240, the image clusters 250, and/or the image search result sets 254, to provide an intelligent automatic image suggestion service. In some embodiments, the auto-suggest module 256 associates, or interactively suggests a visual media file 134 to be associated, with other electronic content based on a semantic label 136 assigned to the visual media file 134 by the computing system. To do this, the auto-suggest module 256 includes a persistent input monitoring mechanism that monitors user inputs received by the visual content realization interface module 110 and/or other user interface modules of the computing system 100, including inputs received by other applications running on the computing system 100. The auto-suggest module 256 evaluates the user inputs over time, determines if any user inputs match any of the semantic labels 136, and, if an input matches a semantic label 136, suggests the relevant images 210 in response to the user input. For example, if the auto-suggest module 256 detects text input as a wall post to a social media page, the auto-suggest module 256 looks for images in the collection 150 that have visual content relevant to the content of the wall post, in an automated fashion. If the auto-suggest module 256 determines that an image 210 contains visual content that matches the content of the wall post, the auto-suggest module 256 displays a thumbnail of the matching image as a suggested supplement or attachment to the wall post.

In some embodiments, the auto-suggest module 256 operates in conjunction with other modules of the subsystem 132 to interactively suggest a semantic label 136 to associate with an image 210 of a visual media file 134. For example, if the system 100 determines that an unlabeled input image 210 has similar visual content to an already-labeled image in the collection 150 (e.g. based on the visual features 232 depicted in the visual media file 134), the system 100 may suggest that the semantic label 136 associated with the image in the collection 150 be propagated to the unlabeled input image 210.

Figure 3:
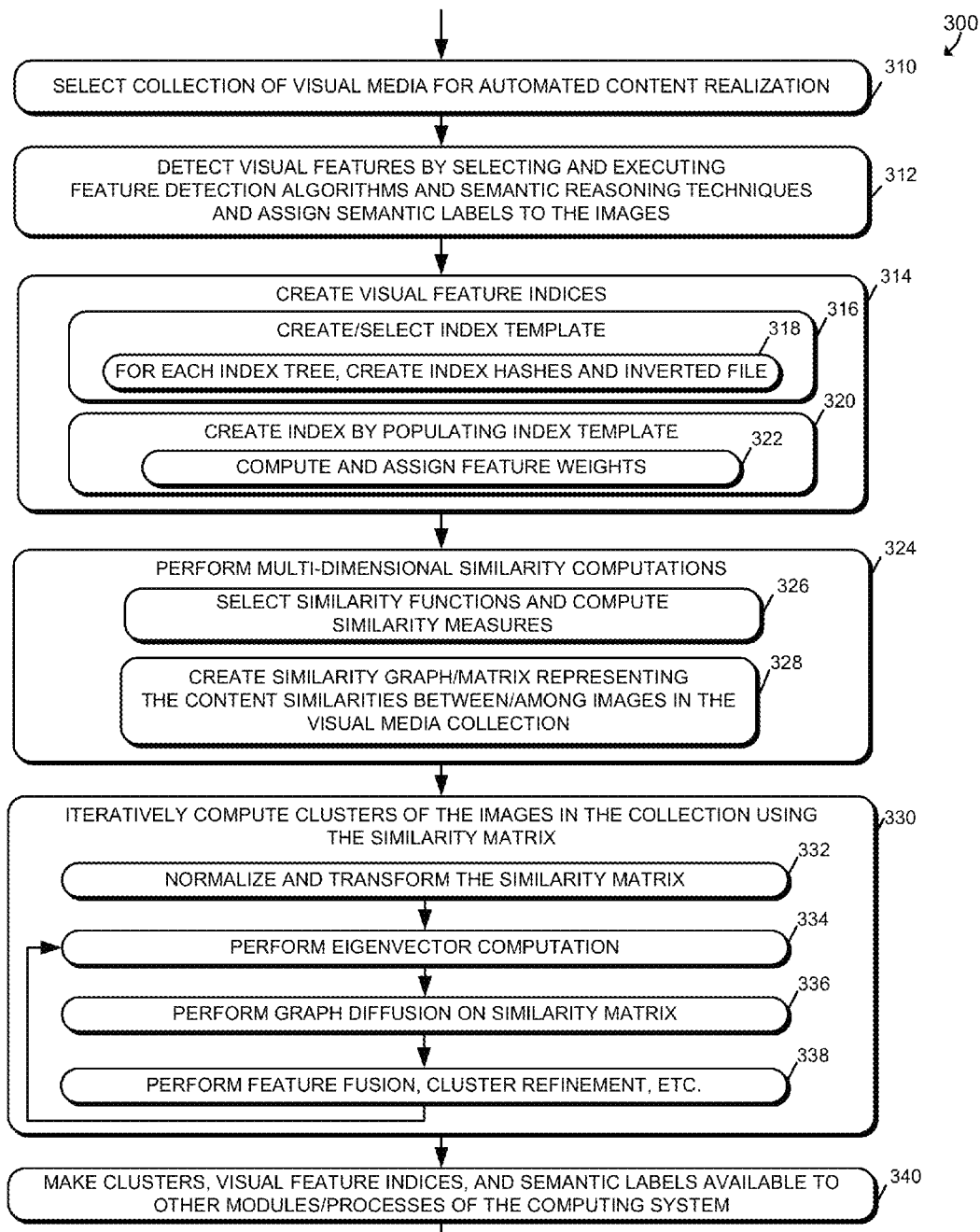
FIG. 3 is a simplified flow diagram of at least one embodiment of a process by which the computing system of FIG. 1 may provide visual content understanding and realization as disclosed herein.

Referring now to FIG. 3, an example of a process 300 implemented as computer-readable instructions executed by the computing system 100 to perform visual content realization and understanding is shown. The process 300 may be embodied as computerized programs, routines, logic and/or instructions executed by the computing system 100, for example by one or more of the modules and other components of the computing system 100 shown in FIGS. 1 and 2, described above. At block 310, the system 100 selects a collection of visual media (e.g., the collection 150) on which to perform automated content realization. To do this, the system 100 responds to a content realization trigger, such as a cue/request 118. The selected visual media collection may reside on a single computing device or may be distributed across multiple devices. For example, the collection may include images that are stored in camera applications of multiple personal electronic devices (e.g., tablet, smartphone, etc.), or the collection may include images uploaded to one or more Internet-based services, such as social media applications, photo editing applications, and/or others. At block 312, the system 100 detects the visual features (e.g., the features 232) depicted in the images contained in the visual media collection selected in block 310. To do this, the system 100 selects and executes a number of feature detection algorithms and semantic reasoning techniques (e.g. algorithms 214 and feature models 216) on the collection, and based on the results of the feature detection and semantic reasoning processes, assigns semantic labels (e.g., semantic labels 136) to the images in the collection. At block 314, the system 100 creates visual feature indices (e.g., the visual feature indices 240) to index the visual features detected in block 312. To do this, the system 100 creates or selects an index template (block 316) by, creating a visual feature index tree by creating, for each tree, index hashes and an inverted file (block 318). The system 100 uses the index template created at block 316 to create the visual feature index for each image, by populating the image template with image and feature information (block 320). At block 322, the system 100 computes feature weights for each feature relative to the collection as a whole, and assigns the feature weights to the features in the index.

At block 324, the system 100 performs multi-dimensional similarity computations. To do this, the system 100 selects one or more similarity functions for use in determining feature-based image similarities, and executes the selected similarity functions to compute the feature-based similarity measures (block 326). At block 328, the system 100 creates a similarity graph/matrix that represents the visual content similarities between or among the images in the visual media collection, as determined by pairwise comparison of the visual features associated with the images in the collection.

At block 330, the system 100 iteratively computes clusters (e.g., clusters 250) of the images in the visual media collection using the similarity graph/matrix created at block 328. To do this, the system 100 normalizes and transforms the similarity matrix to a normalized affinity matrix that is row-stochastic (and non-symmetric) (block 332), performs Eigenvector decomposition of the similarity matrix to find the first non-identity (e.g., second-largest) Eigenvector (block 334), performs graph diffusion on the similarity matrix (block 336) and repeats the processes of block 334 and block 336 iteratively until the desired number of clusters is produced or some other clustering criterion is achieved. At block 338, the system 100 performs feature fusion (e.g., by the multi-feature fusion component 260, described above) and/or cluster refinement (e.g., by the cluster refinement component 262, described above). Performing feature fusion at block 338 results in the combination or merging of multiple clusters, while cluster refinement results in the modification of individual clusters (e.g., to improve the "purity" of the cluster) or the elimination of certain clusters (e.g., based on a low purity metric). At block 340, the system 100 exposes the clusters produced in block 330, the feature indices produced in block 314, the semantic labels produced in block 312, and/or other information, for use by other modules and/or processes of the computing system 100, including other modules of the visual content understanding subsystem 132 and/or other applications, services, or processes running on the computing system 100.

Figure 4:
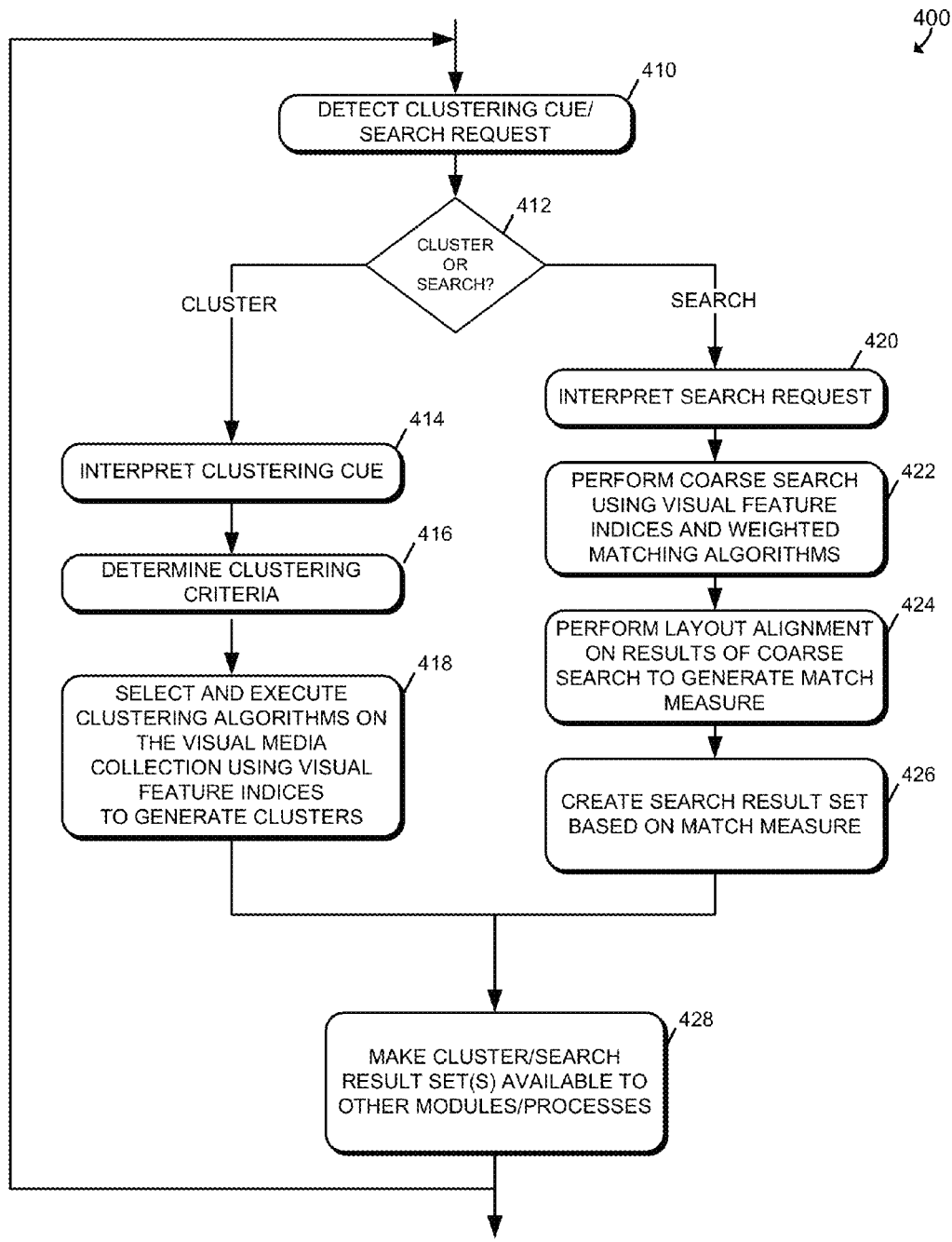
FIG. 4 is a simplified flow diagram of at least one embodiment of a process by which the computing system of FIG. 1 may provide visual content clustering, search and exploration assistance as disclosed herein.

Referring now to FIG. 4, an example of a process 400 implemented as computer-readable instructions executed by the computing system 100 to provide interactive visual content clustering, search and exploration assistance is shown. The process 400 may be embodied as computerized programs, routines, logic and/or instructions executed by the computing system 100, for example by one or more of the modules and other components of the computing system 100 shown in FIGS. 1 and 2, described above. At block 410, the system 100 detects a clustering cue or search request (e.g., a cue/request 118), such as a probe image/query image. At block 412, the system 100 analyzes the cue/request received or detected at block 410, and determines whether the cue/request is to conduct a clustering process or to conduct a visual search of a collection of visual media. If the system 100 determines that the cue/request is to cluster, the system 100 proceeds to block 414. At block 414, the system 100 interprets the clustering cue, as needed. For example, the system 100 determines the location and/or scope of the visual media collection to be clustered, based on user input and/or other information. At block 416, the system 100 determines one or more clustering criteria, if any. For example, the system 100 may detect user-specific clustering criteria relating to the content of desired clusters, or the system 100 may refer to system-defined clustering criteria specifying, e.g., limits on the number of clusters to create or the number of images to include in a cluster. At block 418, the system 100 selects and executes clustering algorithms (e.g., clustering algorithms 248) on the visual media collection identified in block 414. In doing so, the system 100 utilizes visual feature indices (e.g., indices 240) to generate the clusters (e.g., clusters 250).

If at block 412 the system 100 determines to execute a visual search, the system 100 proceeds to block 420. At block 420, the system 100 interprets the search request, as needed. For example, if the search request contains a query image, the system 100 may execute feature detection algorithms to identify one or more visual features of the query image. At block 422, the system 100 performs a coarse searching step in which visual feature indices (e.g., indices 240) are searched for features that are similar to the visual features of the query image. The system 100 utilizes a weighted matching algorithm to identify a "short list" of potential matching images from a visual media collection based on similarity of visual content of the query image and visual content of the images in the visual media collection. In some embodiments, the system 100 proceeds from block 422 directly to block 426, described below. In other embodiments, the system 100 proceeds to block 424. At block 424, the system 100 executes geometric, topological, relational, or other alignment algorithms on the images in the short list produced at block 422. Based on the output of the alignment processes, the system 100 generates a match measure for each of the images in the short list, and uses the match measure to generate a "final" ordered list of images in the visual media collection that match the query image. At block 426, the system 100 creates a search result set (e.g., result set 254) based on the match measure generated at block 424 or the short list generated at block 422.

The system 100 proceeds to block 428 from either block 418 or block 426, depending on the result of the decision block 412. At block 428, the system 100 makes the cluster(s) generated at block 418 or the search result set(s) generated at block 422 or block 424 available to other modules and/or processes of the computing system 100 (including, for example, modules and/or processes that are external to the visual content understanding subsystem 132). Following block 428, the system 100 returns to block 410, thereby enabling iterative exploration of a visual media collection using clustering, searching, or a combination of clustering and searching.

Figure 5:
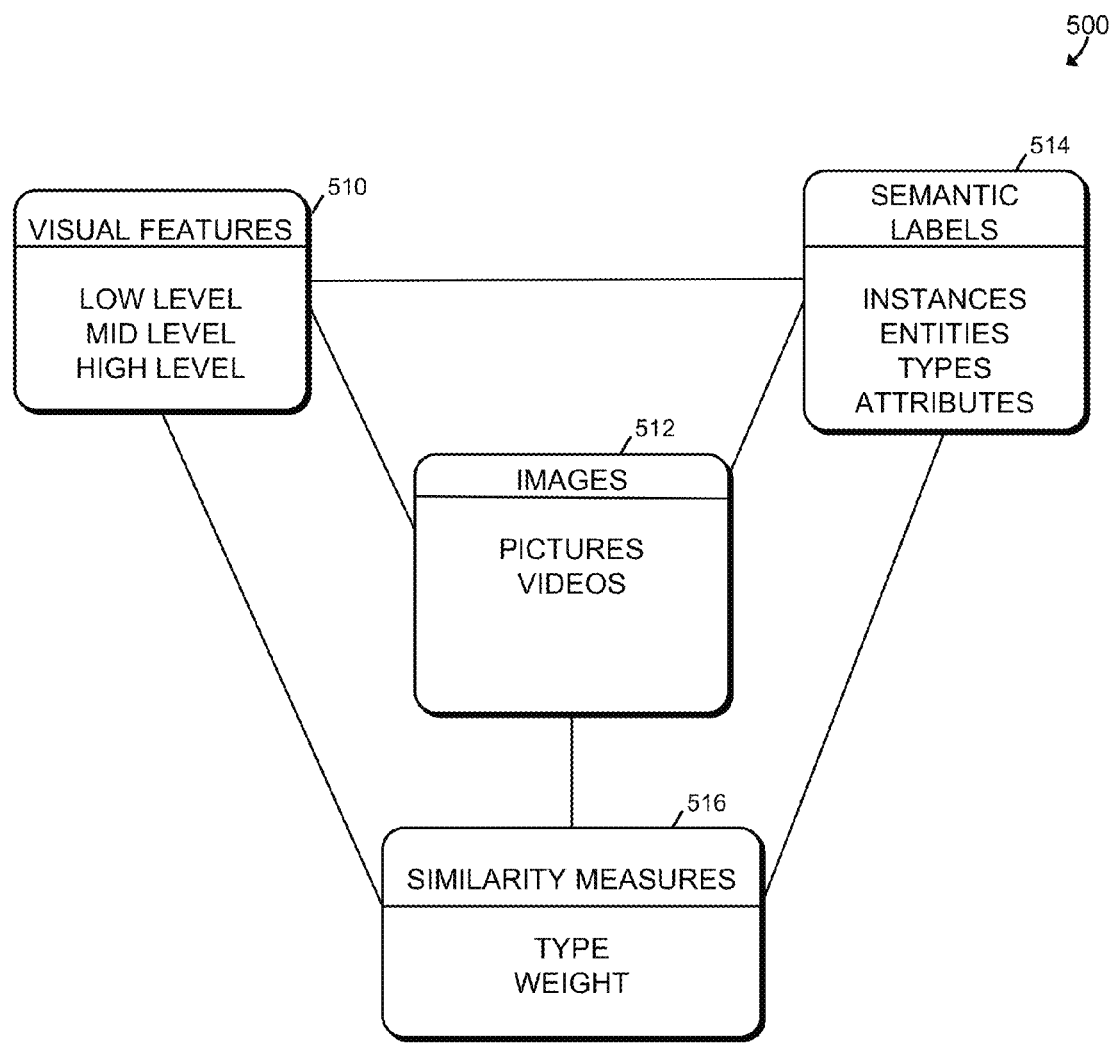
FIG. 5 is a simplified schematic illustration of at least one embodiment of a data structure for representing relationships between visual features, semantic labels, images, and similarity measures as disclosed herein.

Referring now to FIG. 5, a simplified depiction of an embodiment of the ontology 500 is shown in greater detail. The illustrative ontology 500 and portions thereof may be embodied as one or more data structures, such as a searchable database, table, or knowledge base, in software, firmware, hardware, or a combination thereof. For example, portions of the ontology 500 may be embodied in the feature models 216, the semantic label database 224, and/or the visual feature indices 240. The ontology 500 establishes relationships (e.g. logical links or associations) between and/or among images 512, features 510, semantic labels 514, and similarity measures 516. For example, the ontology 500 relates combinations of features 510 with corresponding semantic labels. The ontology 500 also relates similarity measures 516 to features 510, images 512, and semantic labels 514. For example, the ontology 500 may be used to identify sets of features 510, images 512, or semantic labels 514 that have a high degree of similarity according to one or more similarity measures 516. Additionally, the ontology 500 establishes spatial, temporal, or other types of relationships between visual features, between semantic labels, or between visual features and semantic labels. For example, the ontology 500 may be used to provide the visual content understanding subsystem 132 with parameters that the subsystem 132 can use to determine, algorithmically, whether a person is standing "next to" a car, in an image or whether a person is "wearing" a hat, in order to enable the system 100 to respond effectively to a cue/request 118. The relationships between different combinations of features, semantic labels, images, and similarity measures can be defined using, e.g., rules, templates, and/or probabilistic models. For example, the ontology may be embodied as a graph database, such as Neo4j.

The system 140 can use the ontology 500 in performing the semantic reasoning to determine semantic labels 136 to apply to images 210. The ontology 500 may be initially developed through a manual authoring process and/or by executing machine learning algorithms on sets of training data. The ontology 500 may be updated in response to use of the system 100 over time using, e.g., one or more machine learning techniques. The ontology 500 may be stored in computer memory, e.g., in the data storage devices 720, 760 shown in FIG. 7.

Example Usage Scenarios

Various applications of the visual content exploration, clustering, and search technologies disclosed herein include applications addressed to: (i) consumers with a "mess" of numerous images and videos at their hands for which they have no good tools for exploration, search and summarization; (ii) users of image and video data posted to, or collected from, the web and social media; (iii) users of image and video data collected from controlled sources used by law enforcement agencies; advertisers who may want to spot specific instances of objects, logos, scenes and other patterns in imagery on the basis of which they may display visual and other advertisement related information and media; and (iv)

enterprises with large imagery collections who want to provide easy and targeted access to the imagery to a variety of users.

An application of the technologies disclosed herein enables users to formulate and execute simple and complex queries that help users derive valuable information from imagery and the associated metadata. For instance, a complex query may be: "Find me imagery that contains at least 2 people, with one person being a Young Male who looks like THIS, standing next to a Red Sedan that looks like THIS in an Outdoor City locale given by THIS sample image", where "THIS" is an example image or region within an image. As is clear from the above query, the system 100 will entertain queries that have both semantic entities and their attributes, such as a "person", "young male," and also visual attributes such as vehicle like THIS, where THIS is specified as an instance using one or more sample images.

Another application of the disclosed technologies automatically retrieves relevant photos/videos in real-time, based on semantic concepts expressed by a user in a text message, email or as a pre-defined set of concepts of interest to a specific user. For instance, as a user is typing a message to a family member or as a social media post, about his or her pet bird, the system automatically suggests and displays recent pictures of the pet bird, or thumbnail images of the pictures, in a manner that enables the user to easily select one or more of the pictures to include in or attach to the message.

The automatic image suggestion features disclosed herein and other aspects of the disclosed technologies can be applied across different user-level software applications or integrated with particular software applications. For example, application extensions available in mobile operating systems such as ANDROID and iOS can be used to "hook" the technologies disclosed herein into other applications or across applications at the operating system level. So, whether the user is working on a document in a word processing application or sending a message using an email program or messaging service, the computing system 100 can analyze and map the text input supplied by the user to visual images in the collection 150 and automatically offer image suggestions based on the typed content. Additionally, the system 100 can extract contextual information from the typed text or related structured data (such as sender, recipient, date, etc.) and incorporate the contextual information into the automatic image search.

Other applications are made possible through a combination of automatic indexing, exploration and searching of visual media as disclosed herein. For example, the system 100 can be used to automatically organize unorganized collections of photographs in meaningful ways, such as in terms of visual similarity of scenes, objects in a scene, faces, people, symbols/logos etc. In some embodiments, the system 100 can automatically provide a "storyboard" that organizes photos in a natural sequence of events, where the events are inferred from the visual content extracted from all the photos acquired during a day or during an occasion in which the photos are taken.

As another example, advertisers interested in identifying images in which their logos or symbols appear in photo collections, social media, television etc. can use the automatic indexing and visual search components disclosed herein. Images and video may be automatically collected from the sources mentioned above, and indexed using features that are best suited to scene or logos/symbols matching. These indices can be stored and continuously updated with newly acquired data. Advertisers can then search against these indices using images of their logos or symbols. Image-enhanced advertising can use visual media clustering and search technologies disclosed herein to, for example, link relevant images (e.g., attribute-specific) of celebrities with a particular product or to find aesthetically pleasing images of a product for which a search is being conducted. Other embodiments include additional features, alternatively or in addition to those described above.

Implementation Examples

Figure 7:
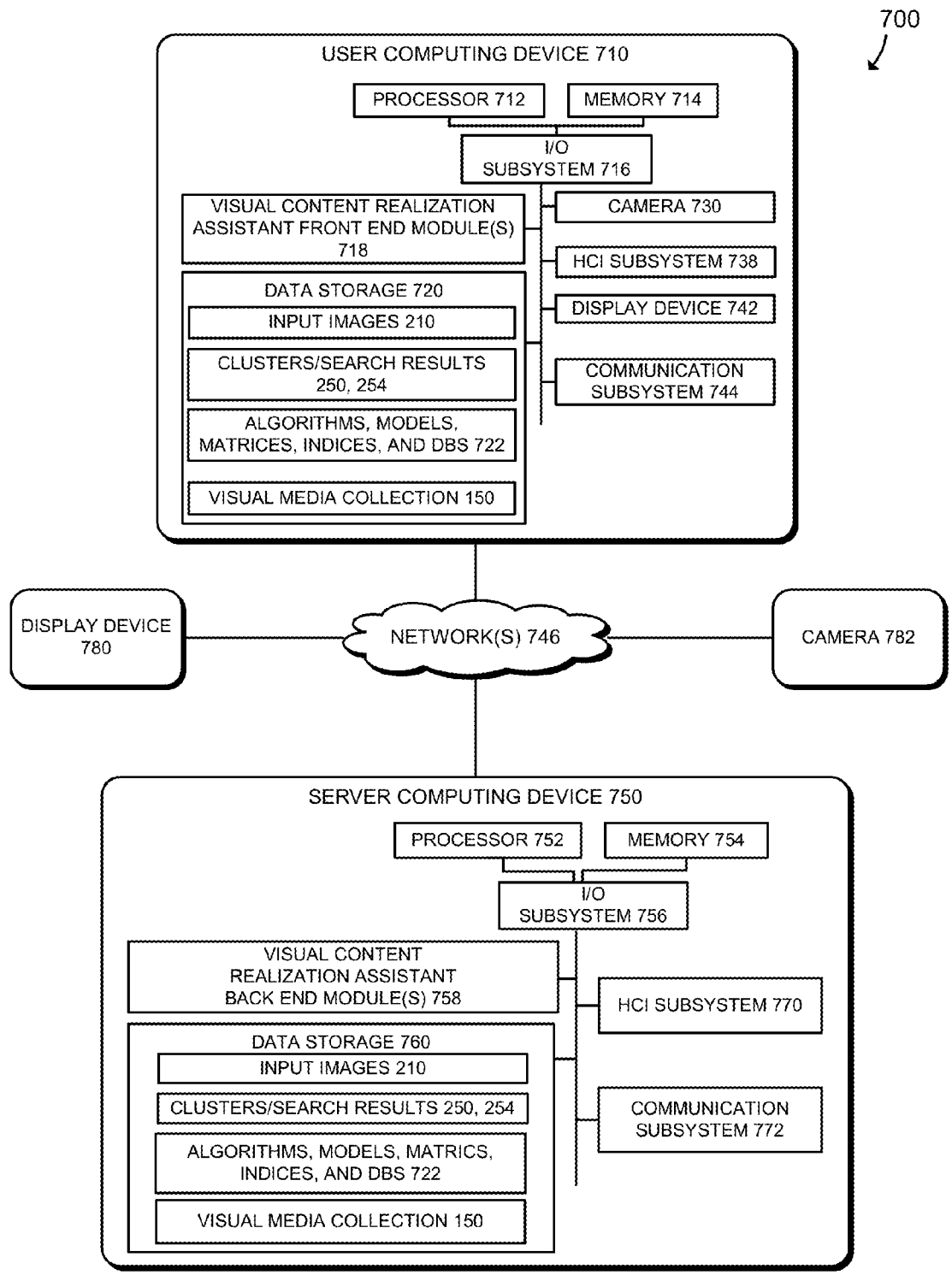
FIG. 7 is a simplified block diagram of an exemplary computing environment in connection with which at least one embodiment of the system of FIG. 1 may be implemented.

Referring now to FIG. 7, a simplified block diagram of an embodiment 700 of the multi-dimensional visual content realization computing system 100 is shown. While the illustrative embodiment 700 is shown as involving multiple components and devices, it should be understood that the computing system 100 may constitute a single computing device, alone or in combination with other devices. The embodiment 700 includes a user computing device 710, which embodies features and functionality of a "client-side" or "front end" portion 718 of the components of the computing system 100 depicted in FIGS. 1-2, and a server computing device 750, which embodies features and functionality of a "server-side" or "back end" portion 758 of the components of the system 100. The embodiment 700 includes a display device 780 and a camera 782, each of which may be used alternatively or in addition to the camera 730 and display device 742 of the user computing device 710. Each or any of the computing devices 710, 750, 780, 782 may be in communication with one another via one or more networks 746.

The computing system 100 or portions thereof may be distributed across multiple computing devices that are connected to the network(s) 746 as shown. In other embodiments, however, the computing system 100 may be located entirely on, for example, the computing device 710 or one of the devices 750, 780, 782. In some embodiments, portions of the system 100 may be incorporated into other systems or computer applications (e.g. as a plugin). Such applications or systems may include, for example, virtual personal assistant applications, content sharing services such as YOUTUBE and INSTAGRAM, and social media services such as FACEBOOK and TWITTER. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative user computing device 710 includes at least one processor 712 (e.g. a microprocessor, microcontroller, digital signal processor, etc.), memory 714, and an input/output (I/O) subsystem 716. The computing device 710 may be embodied as any type of computing device capable of performing the functions described herein, such as a personal computer (e.g., desktop, laptop, tablet, smart phone, body-mounted device, wearable device, etc.), a server, an enterprise computer system, a network of computers, a combination of computers and other electronic devices, or other electronic devices. Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of hardware and/or software components, including the components of the computing system shown in FIGS. 1 and 2 or portions thereof (e.g., the front end modules 718), the camera 730, and the display device 742. As used herein, a "camera" may refer to any device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "stand-off" cameras that are installed in walls or ceilings), and/or mobile cameras (such as cameras that are integrated with consumer electronic devices, such as laptop computers, smart phones, tablet computers, wearable electronic devices and/or others.

The camera 730 and the display device 742 may form part of a human-computer interface subsystem 738, which includes one or more user input devices (e.g., a touchscreen, keyboard, virtual keypad, microphone, etc.) and one or more output devices (e.g., speakers, displays, LEDs, etc.). The human-computer interface subsystem 738 may include devices such as, for example, a touchscreen display, a touch-sensitive keypad, a kinetic sensor and/or other gesture-detecting device, an eye-tracking sensor, and/or other devices that are capable of detecting human interactions with a computing device.

The devices 730, 738, 742, 780, 782 are illustrated in FIG. 7 as being in communication with the user computing device 710, either by the I/O subsystem 716 or a network 746. It should be understood that any or all of the devices 730, 738, 742, 780, 782 may be integrated with the computing device 710 or embodied as a separate component. For example, the camera 730 may be embodied in a wearable device, such as a head-mounted display, GOOGLE GLASS-type device or BLUETOOTH earpiece, which then communicates wirelessly with the computing device 710. Alternatively, the devices 730, 738, 742, 780, 782 may be embodied in a single computing device, such as a smartphone or tablet computing device.

The I/O subsystem 716 is also communicatively coupled to one or more storage media 720, and a communication subsystem 744. It should be understood that each of the foregoing components and/or systems may be integrated with the computing device 710 or may be a separate component or system that is in communication with the I/O subsystem 716 (e.g., over a network 746 or a bus connection).

The storage media 720 may include one or more hard drives or other suitable data storage devices (e.g., flash memory, memory cards, memory sticks, and/or others). In some embodiments, portions of the computing system 100, e.g., the front end modules 718 and/or the input images 210, clusters/search results 250, 254, algorithms models matrices, indices and databases (collectively identified as 722), the visual media collection 150, and/or other data, reside at least temporarily in the storage media 720. Portions of the computing system 100, e.g., the front end modules 718 and/or the input images 210, clusters/search results 250, 254, algorithms models matrices, indices and databases (collectively identified as 722), the visual media collection 150, and/or other data, and/or other data may be copied to the memory 714 during operation of the computing device 710, for faster processing or other reasons.

The communication subsystem 744 communicatively couples the user computing device 610 to one or more other devices, systems, or communication networks, e.g., a local area network, wide area network, personal cloud, enterprise cloud, public cloud, and/or the Internet, for example. Accordingly, the communication subsystem 744 may include one or more wired or wireless network interface software, firmware, or hardware, for example, as may be needed pursuant to the specifications and/or design of the particular embodiment of the system 100.

The display device 780, the camera 782, and the server computing device 750 each may be embodied as any suitable type of computing device or personal electronic device capable of performing the functions described herein, such as any of the aforementioned types of devices or other electronic devices. For example, in some embodiments, the server computing device 750 may operate a "back end" portion 758 of the computing system 100. The server computing device 750 may include one or more server computers including storage media 760, which may be used to store portions of the computing system 100, such as the back end modules 758 and/or the input images 210, clusters/search results 250, 254, algorithms models matrices, indices and databases 722, the visual media collection 150, and/or other data. The illustrative server computing device 750 also includes an HCI subsystem 770, and a communication subsystem 772. In general, components of the server computing device 750 having similar names to components of the computing device 610 described above may be embodied similarly. Further, each of the devices 680, 682 may include components similar to those described above in connection with the user computing device 710 and/or the server computing device 750. The computing system 100 may include other components, sub-components, and devices not illustrated in FIG. 7 for clarity of the description. In general, the components of the computing system 100 are communicatively coupled as shown in FIG. 7 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a computing system, for understanding the content of a collection of visual media files including one or more of digital images and digital videos, includes a plurality of instructions embodied in one or more non-transitory machine accessible storage media and executable by one or more computing devices to cause the computing system to: execute a plurality of different feature detection algorithms on the collection of visual media files; elicit, based on the execution of the feature detection algorithms, a plurality of different visual features depicted in the visual media files; and cluster the visual media files by, for each of the visual media files in the collection: computing a plurality of similarity measures, each similarity measure representing a measurement of similarity of visual content of the visual media file to one of the visual features elicited as a result of the execution of the feature detection algorithms; and associating the visual media file with a visual feature based on the similarity measure computed for the visual media file with respect to the visual feature.

An example 2 includes the subject matter of example 1, and includes instructions executable by the computing system to interactively display a cluster, the cluster graphically indicating the associations of the visual media files with the visual feature elicited as a result of the execution of the feature detection algorithms. An example 3 includes the subject matter of example 1 or example 2, and includes instructions executable by the computing system to display a graphical representation of the similarity measure computed for each of the visual media files in the cluster with respect to the visual feature elicited as a result of the execution of the feature detection algorithms. An example A4 includes the subject matter of any of examples 1-3, and includes instructions executable by the computing system to interactively display a plurality of different clusters, wherein each of the clusters graphically indicates the associations of the visual media files with a different visual feature elicited as a result of the execution of the feature detection algorithms. An example 5 includes the subject matter of any of examples 1-4, and includes instructions executable by the computing system to interactively display a graphical representation of the similarity measure computed for each of the visual media files with respect to each of the plurality of different clusters. An example 6 includes the subject matter of example 4, and includes instructions executable by the computing system to associate each of the visual media files with one or more clusters. An example 7 includes the subject matter of example 6, and includes instructions executable by the computing system to compute a super-cluster comprising a plurality of visual media files that are all associated with the same combination of multiple clusters. An example 8 includes the subject matter of any of examples 1-7, and includes instructions executable by the computing system to (i) elicit, based on the execution of the feature detection algorithms, a distinctive visual feature depicted in one or more of the visual media files, (ii) for each of the visual media files in the collection: compute a similarity measure representing a measurement of similarity of visual content of the visual media file to the distinctive visual feature, and associate the visual media file with the distinctive visual feature based on the computed similarity measure; and (iii) interactively display the cluster graphically indicating the associations of the visual media files with the distinctive visual feature. An example 9. includes the subject matter of example 8, wherein the distinctive visual feature is representative of one or more of: a logo, a trademark, a slogan, a distinctive object, a distinctive scene, and a distinctive pattern of imagery. An example 10 includes the subject matter of any of examples 1-9, and includes instructions executable by the computing system to (i) elicit, based on the execution of the feature detection algorithms, an attribute of one of the visual features, (ii) for each of the visual media files in the collection: compute a similarity measure representing a measurement of similarity of visual content of the visual media file to the attribute of the visual feature, and associate the visual media file with the attribute of the visual feature based on the computed similarity measure; and (iii) interactively display the cluster graphically indicating the associations of the visual media files with the attribute of the visual feature. An example 11 includes the subject matter of example 10, wherein the attribute of the visual feature comprises one or more of: a shape, a size, a location, a color, and a texture of the visual feature. An example 12 includes the subject matter of any of examples 1-11, wherein the visual content used to compute the similarity measure is a localized portion of the visual content of the entire visual media file, and the computing system comprises instructions executable by the computing system to associate the visual media file with a visual feature elicited as a result of the execution of the feature detection algorithms based on the similarity measure computed for the localized portion of the visual content of the visual media file with respect to the visual feature. An example 13 includes the subject matter of any of examples 1-12, and includes instructions executable by the computing system to elicit one of the visual features depicted in the visual media files based on the execution of a combination of different feature detection algorithms. An example 14 includes the subject matter of any of examples 1-13, and includes instructions executable by the computing system to select the plurality of different feature detection algorithms to execute on the collection of visual media files based on an algorithm selection criterion. An example 15 includes the subject matter of any of examples 1-14, and includes instructions executable by the computing system to select the plurality of different feature detection algorithms from a set of feature detection algorithms comprising algorithms configured to generate visual feature descriptors at a plurality of different levels of abstraction. An example 16 includes the subject matter of example 15, and includes instructions executable by the computing system to select the plurality of different feature detection algorithms from a set of feature detection algorithms comprising algorithms configured to detect low-level features and algorithms configured to detect semantic-level features. An example 17 includes the subject matter of any of examples 1-16, and includes instructions executable by the computing system to select the plurality of different feature detection algorithms to execute on the collection of visual media files based on an algorithm selection criterion. An example 18 includes the subject matter of any of examples 1-17, and includes instructions executable by the computing system to modify the cluster in response a clustering cue comprising one or more of: a geometrically-based image similarity criterion, user input specifying an image similarity criterion, and user feedback implicitly indicating a similarity criterion. An example 19 includes the subject matter of any of examples 1-18, and includes instructions executable by the computing system to interactively display an unspecified number of different clusters, wherein each of the clusters graphically indicates the associations of the visual media files with a different visual feature elicited as a result of the execution of the feature detection algorithms. An example 20 includes the subject matter of any of examples 1-19, and includes instructions executable by the computing system to compute a purity metric indicative of the degree to which images in a given cluster have a visual feature or set of visual features in common, and modify one or more of the clusters based on the purity metric.

In an example 21, an image search assistant is embodied in one or more machine accessible storage media and includes instructions executable by a computing system including one or more computing devices to, in response to a selection of a query image: determine, by executing a plurality of different feature detection algorithms on the query image, a combination of different visual features depicted in the query image; and execute a matching algorithm to measure the similarity of the combination of visual features of the query image to indexed visual features of a collection of images, wherein the indexed visual features are determined by executing the feature detection algorithms on images in the collection of images and executing an indexing algorithm to create an index of the visual features in the collection of images; and based on the execution of the matching algorithm, interactively identify, by a human-computer interface device of the computing system, one or more images in the collection of images matching the combination of visual features depicted in the query image.

An example 22 includes the subject matter of example 21, and includes instructions executable by the computing system to: based on the execution of the feature detection algorithms, determine a distinctive visual feature of the query image, execute the matching algorithm to measure the similarity of the distinctive visual feature to the indexed visual features, and interactively identify one or more images in the collection of images matching the distinctive visual feature. An example 23 includes the subject matter of example 22, wherein the distinctive visual feature comprises one or more of: a logo, a trademark, a slogan, a distinctive object, a distinctive scene, and a distinctive pattern of imagery. An example 24 includes the subject matter of any of examples 21-23, and includes instructions executable by the computing system to: based on the execution of the feature detection algorithms, determine a visual feature of the query image and an attribute of the visual feature, execute the matching algorithm to measure the similarity of the attribute of the visual feature to the indexed visual features, and interactively identify one or more images in the collection of images matching the attribute of the visual feature. An example 25 includes the subject matter of example 24, wherein the attribute of the visual feature comprises one or more of: a shape, a size, a location, a color, and a texture of the visual feature of the query image. An example 26 includes the subject matter of any of examples 21-25, wherein executing the matching algorithm comprises executing a coarse search to compare the combination of visual features in the query image to the index based on appearance characteristics of the combination of visual features, and based on the coarse search, create a short list of images having a likelihood of matching the query image. An example 27 includes the subject matter of example 26, wherein executing the matching algorithm comprises executing a fine search to compare the layout of the combination of visual features in the query image to the layout of the images in the short list, and based on the fine search, creating an ordered list of images having a likelihood of matching the query image.

In an example 28, a computing system, for realizing visual content of an unordered collection of visual media files including one or more of image files and video files, includes instructions embodied in one or more non-transitory machine accessible storage media and executable by one or more computing devices to cause the computing system to: determine, by executing a plurality of different feature detection algorithms on the collection, a plurality of different visual features depicted in the visual media files in the collection; with the visual features, compute a plurality of different similarity measures for each of the visual media files in the collection, each of the similarity measures defined by a different similarity function; and create an index for the collection by, for each visual media file in the collection: indexing the visual features of the visual media file; and computing a weight for each of the visual features in the index, the weight indicative of a relation of the visual feature to the visual content of the collection as a whole.

An example 29 includes the subject matter of example 28, and includes instructions to cause the computing system to create a plurality of randomized index trees, each of the index trees comprising a plurality of nodes including internal nodes and leaf nodes, wherein each internal node encodes decision logic and each leaf node represents a set of features and a corresponding set of visual media files that depict the set of features. An example 30 includes the subject matter of any of examples 28-29, and includes instructions to cause the computing system to create an index template, the index template representative of visual features in a large dataset of images, and use the index template to create the index for the collection. An example 31 includes the subject matter of any of examples 28-30, wherein each similarity function represents a different pattern of similarity of visual content across the visual media files in the collection. An example 32 includes the subject matter of any of examples 28-31, and includes instructions to cause the computing system to aggregate the visual features across the visual media files to determine the different patterns of similarity. An example 33 includes the subject matter of any of examples 28-32, wherein the similarity measures are computed by creating a sparse similarity matrix comprising a plurality of rows, wherein each row corresponds to a visual media file in the collection and each element of each row comprises data indicating a similarity of the content of the visual media file to the content of another visual media file in the collection. An example 34 includes the subject matter of example 33, and includes instructions to cause the computing system to execute an iterative spectral clustering algorithm on the similarity matrix.

In an example 35, a computing system, for realizing content of a collection of visual media files including one or more of digital images and digital videos, includes a plurality of instructions embodied in one or more machine accessible storage media and executable by one or more computing devices to cause the computing system to: execute a plurality of different feature detection algorithms on the collection of visual media files; determine, based on the execution of the feature detection algorithms, a plurality of different visual features depicted in the visual media files; map the visual features to semantic labels describing the semantic content of the visual features; and create a plurality of different clusters of the visual media files according to the semantic labels. An example 36 includes the subject matter of example 35, and includes instructions to cause the computing system to iteratively create sub-clusters and super-clusters of the visual media files based on the semantic labels, wherein the super-clusters comprise visual media files having visual content associated with a common category and the sub-clusters comprise visual media files depicting instances of items associated with the common category. An example 37 includes the subject matter of any of examples 35-36, comprising instructions to cause the computing system to select a visual media file from one of the plurality of clusters and execute a search of the collection to identify other visual media files matching the selected visual media file. An example 38 includes the subject matter of example 37, and includes instructions to cause the computing system to algorithmically determine a visual feature depicted in the selected visual media file, and execute the search to generate a search result set comprising other visual media files matching the visual feature elicited as a result of the execution of the feature detection algorithms. An example 39 includes the subject matter of example 38, and includes instructions to cause the computing system to select a visual media file from the search result set, algorithmically elicit a visual feature depicted in the visual media file selected from the search result set, and create a new cluster comprising visual media files of the collection having a type of similarity to the visual feature elicited from the visual media file selected from the search result set. An example 40 includes the subject matter of any of examples 35-39, and includes instructions to cause the computing system to select a visual media file from one of the plurality of clusters, algorithmically elicit a visual feature depicted in the selected visual media file, and create a new cluster comprising visual media files of the collection having a type of similarity to the visual feature elicited from the selected visual media file. An example 41 includes the subject matter of any of examples 35-40, and includes instructions to cause the computing system to interactively suggest a semantic label to associate with a visual media file based on the visual features depicted in the visual media file. An example 42 includes the subject matter of any of examples 35-41, and includes instructions to cause the computing system to assign a semantic label to a visual media file based on one or more visual features depicted in the visual media file. An example 43 includes the subject matter of example 42, and includes instructions to cause the computing system to associate a visual media file with other electronic content based on a semantic label assigned to the visual media file by the computing system.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. An image search assistant embodied in one or more machine accessible storage media and comprising instructions executable by a computing system comprising one or more computing devices to, in response to a selection of a query image: determine, by executing a plurality of different feature detection algorithms on the query image, a combination of different visual features depicted in the query image; and execute a matching algorithm to measure the similarity of the combination of visual features of the query image to indexed visual features of a collection of images, wherein the indexed visual features are determined by executing the feature detection algorithms on images in the collection of images and executing an indexing algorithm to create an index of the visual features in the collection of images; and based on the execution of the matching algorithm, interactively identify, by a human-computer interface device of the computing system, one or more images in the collection of images matching the combination of visual features depicted in the query image, wherein executing the matching algorithm comprises executing a fine search to compare the layout of the combination of visual features in the query image to the layout of the images in a short list, and based on the fine search, creating an ordered list of images having a likelihood of matching the query image.

2. The image search assistant of claim 1, comprising instructions executable by the computing system to: based on the execution of the feature detection algorithms, determine a distinctive visual feature of the query image, execute the matching algorithm to measure the similarity of the distinctive visual feature to the indexed visual features, and interactively identify one or more images in the collection of images matching the distinctive visual feature.

3. The image search assistant of claim 2, wherein the distinctive visual feature comprises one or more of: a logo, a trademark, a slogan, a distinctive object, a distinctive scene, and a distinctive pattern of imagery.

4. The image search assistant of claim 1, comprising instructions executable by the computing system to: based on the execution of the feature detection algorithms, determine a visual feature of the query image and an attribute of the visual feature, execute the matching algorithm to measure the similarity of the attribute of the visual feature to the indexed visual features, and interactively identify one or more images in the collection of images matching the attribute of the visual feature.

5. The image search assistant of claim 4, wherein the attribute of the visual feature comprises one or more of: a shape, a size, a location, a color, and a texture of the visual feature of the query image.

6. The image search assistant of claim 1, wherein executing the matching algorithm comprises executing a coarse search to compare the combination of visual features in the query image to the index based on appearance characteristics of the combination of visual features, and based on the coarse search, create a short list of images having a likelihood of matching the query image.

* * * * *